United States Patent
Kolcun et al.

(10) Patent No.: US 10,113,070 B2
(45) Date of Patent: Oct. 30, 2018

(54) PRETREATMENT COMPOSITIONS AND METHODS OF TREATING A SUBSTRATE

(71) Applicant: PPG Industries Ohio, Inc., Cleveland, OH (US)

(72) Inventors: Adam Kolcun, Oakmont, PA (US); Richard M. Vargas, Willoughby, OH (US); Kevin T. Sylvester, Lawrence, PA (US); Nathan J. Silvernail, Allison Park, PA (US); John F. McIntyre, Bay Village, OH (US)

(73) Assignee: PPG industries Ohio, Inc., Cleveland, OH (US)

( * ) Notice: Subject to any disclaimer, the term of this patent is extended or adjusted under 35 U.S.C. 154(b) by 83 days.

(21) Appl. No.: 14/931,913

(22) Filed: Nov. 4, 2015

(65) Prior Publication Data

US 2017/0121533 A1 May 4, 2017

(51) Int. Cl.
*C09D 5/10* (2006.01)
*C23C 22/80* (2006.01)

(52) U.S. Cl.
CPC ..................................... *C09D 5/10* (2013.01)

(58) Field of Classification Search
None
See application file for complete search history.

(56) References Cited

U.S. PATENT DOCUMENTS

| | | |
|---|---|---|
| 2,342,738 A | 2/1944 | Jernstedt |
| 3,076,734 A | 2/1963 | Schimkus |
| 3,455,806 A | 7/1969 | Spoor |
| 3,663,389 A | 5/1972 | Koral et al. |
| 3,708,350 A | 1/1973 | Kennedy |
| 3,749,657 A | 7/1973 | Le Bras et al. |
| 3,793,278 A | 2/1974 | De Bona |
| 3,912,548 A | 10/1975 | Faigen |
| 3,928,157 A | 12/1975 | Suematsu et al. |
| 3,947,338 A | 3/1976 | Jerabek et al. |
| 3,947,339 A | 3/1976 | Jerabek et al. |
| 3,962,165 A | 6/1976 | Bosso et al. |
| 3,975,346 A | 8/1976 | Bosso et al. |
| 3,984,299 A | 10/1976 | Jerabek |

(Continued)

FOREIGN PATENT DOCUMENTS

| | | |
|---|---|---|
| CA | 429562 A | 8/1945 |
| CA | 1162504 A | 2/1984 |

(Continued)

OTHER PUBLICATIONS

Light, Truman S. and Cappuccino, Carleton C., "Determination of Flouride in Toothpaste Using an Ion-Selective Electrode", Journal, Apr. 1975, pp. 247-250, vol. 52.

(Continued)

*Primary Examiner* — Vu A Nguyen
(74) *Attorney, Agent, or Firm* — Alicia M. Passerin, Esq.

(57) ABSTRACT

Disclosed is a pretreatment composition containing (a) a Group IIIB metal, a Group IVB metal, or combinations thereof; and (b) a compound containing at least six phosphorus-containing acid groups or salts thereof; wherein the molar ratio of (a) to (b) is at least 3:1. Also disclosed are methods of treating a substrate with the pretreatment composition and substrates treated with the pretreatment composition.

27 Claims, 1 Drawing Sheet

Scribe Loss vs. Zr/phytic acid molar ratio

(56) References Cited

U.S. PATENT DOCUMENTS

| | | |
|---|---|---|
| 4,001,101 A | 1/1977 | Bosso et al. |
| 4,110,129 A * | 8/1978 | Matsushima ............ C23C 22/83 |
| | | 148/247 |
| 4,116,900 A | 9/1978 | Belanger |
| 4,134,866 A | 1/1979 | Tominaga et al. |
| 4,134,932 A | 1/1979 | Kempter et al. |
| 4,339,310 A | 7/1982 | Oda et al. |
| 4,719,038 A | 1/1988 | Sobata et al. |
| 5,149,382 A | 9/1992 | Gray |
| 5,209,788 A | 5/1993 | McMillen et al. |
| 5,328,525 A | 7/1994 | Musingo et al. |
| 5,449,415 A | 9/1995 | Dolan |
| 5,653,823 A * | 8/1997 | McMillen ............... C23C 22/83 |
| | | 148/247 |
| 5,662,746 A | 9/1997 | Affinito |
| 6,797,387 B2 | 9/2004 | Ambrose et al. |
| 6,875,800 B2 | 4/2005 | Vanier et al. |
| 6,894,086 B2 | 5/2005 | Munro et al. |
| 7,081,483 B2 | 7/2006 | Chaiko |
| 7,432,333 B2 | 10/2008 | Duffy et al. |
| 7,470,752 B2 | 12/2008 | Duffy et al. |
| 7,605,194 B2 | 10/2009 | Ferencz et al. |
| 8,153,344 B2 | 4/2012 | Faler et al. |
| 8,524,323 B2 | 9/2013 | Nagai et al. |
| 8,741,445 B2 | 6/2014 | Bannai et al. |
| 2004/0163736 A1* | 8/2004 | Matsukawa ............ C23C 22/34 |
| | | 148/247 |
| 2005/0287348 A1 | 12/2005 | Faler et al. |
| 2009/0032144 A1* | 2/2009 | McMillen ................ C09D 1/00 |
| | | 148/247 |
| 2009/0071573 A1 | 3/2009 | Brouwer et al. |
| 2009/0239093 A1* | 9/2009 | Inbe .................... C09D 183/08 |
| | | 428/612 |
| 2011/0008645 A1* | 1/2011 | Schneider ............... C23C 22/17 |
| | | 428/640 |
| 2013/0034742 A1* | 2/2013 | Silvernail ............... C23C 22/50 |
| | | 428/615 |

FOREIGN PATENT DOCUMENTS

| | | | |
|---|---|---|---|
| CA | 2087352 A1 | 1/1994 | |
| CN | 1827852 A | 9/2006 | |
| CN | 101225517 A | 7/2008 | |
| CN | 101545107 A | 9/2009 | |
| CN | 101613543 A | 12/2009 | |
| CN | 102134713 A | 7/2011 | |
| CN | 103866315 A | 6/2014 | |
| CN | 104031555 A | 9/2014 | |
| CN | 104194572 A | 12/2014 | |
| CN | 104194573 A | 12/2014 | |
| CN | 104231862 A | 12/2014 | |
| CN | 104262761 A | 1/2015 | |
| DE | 2707405 A1 | 1/1978 | |
| EP | 0012463 A1 | 6/1980 | |
| EP | 0 061 911 A1 * | 10/1982 | ............... C23F 7/10 |
| EP | 0061911 A1 | 10/1982 | |
| JP | S5468733 A | 6/1979 | |
| JP | 59083775 | 5/1984 | |
| JP | S63171685 A | 7/1988 | |
| JP | S63213681 A | 9/1988 | |
| JP | H06248232 A | 9/1994 | |
| JP | H0748682 A | 2/1995 | |
| JP | 2002146554 A | 5/2002 | |
| JP | 2004277849 A | 10/2004 | |
| JP | 2009280886 A | 12/2009 | |
| WO | 1995033869 A1 | 12/1995 | |
| WO | 2001059180 A1 | 8/2001 | |

OTHER PUBLICATIONS

Tang, Fu; Wang, Xiaoyu; Xu, Xinjun; Li, Lidong, "Phytic Acid Doped Nanoparticles for Green Anticorrosion Coatings", Article, Aug. 2010, pp. 101-105, Elsevier B.V.

* cited by examiner

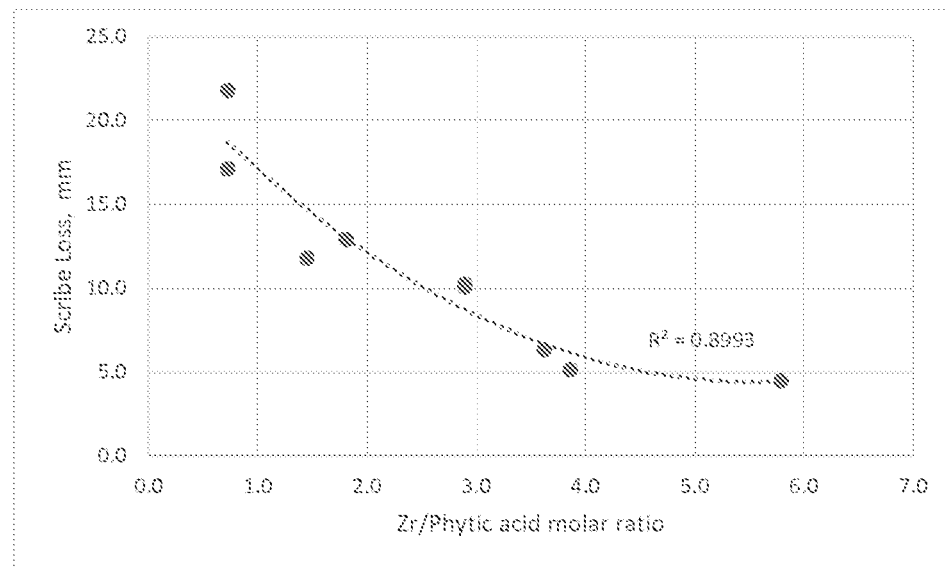
Scribe Loss vs. Zr/phytic acid molar ratio

PRETREATMENT COMPOSITIONS AND METHODS OF TREATING A SUBSTRATE

FIELD

The present invention relates to pretreatment compositions and methods for treating a metal substrate. The present invention also relates to a coated metal substrate.

BACKGROUND

The use of protective coatings on metal substrates for improved corrosion resistance and paint adhesion is common. Conventional techniques for coating such substrates include techniques that involve pretreating the metal substrate with chromium-containing compositions. The use of such chromate-containing compositions, however, imparts environmental and health concerns.

As a result, chromate-free pretreatment compositions have been developed. Such compositions are generally based on chemical mixtures that react with the substrate surface and bind to it to form a protective layer. For example, pretreatment compositions based on a Group IIIB metal or Group IVB metal have become more prevalent. Such compositions often contain a source of free fluoride, i.e., fluoride available as isolated ions in the pretreatment composition as opposed to fluoride that is bound to another element, such as the Group IIIB or a Group IVB metal. Free fluoride can etch the surface of the metal substrate, thereby promoting deposition of a Group IIIB or Group IVB metal coating. Nevertheless, the corrosion resistance capability of these pretreatment compositions has generally been significantly inferior to conventional chromium-containing pretreatments.

It would be desirable to provide compositions and methods for treating a metal substrate that overcome at least some of the previously described drawbacks of the prior art, including the environmental drawbacks associated with the use of chromates. It also would be desirable to provide compositions and methods for treating metal substrate that impart corrosion resistance properties that are equivalent to, or even superior to, the corrosion resistance properties imparted through the use of phosphate- or chromium-containing conversion coatings. It would also be desirable to provide related coated metal substrates.

SUMMARY

Disclosed is a pretreatment composition comprising: (a) a Group IIIB metal and/or a Group IVB metal in a total amount of 20 ppm to 1000 ppm (calculated as elemental metal) based on the total weight of the pretreatment composition; and (b) a compound containing at least six phosphorus-containing acid groups or salts thereof in an amount of from $1.82 \times 10^{-4}$ moles per liter to $2.73 \times 10^{-2}$ moles per liter of pretreatment composition; wherein the molar ratio of (a) to (b) is at least 3:1.

Also disclosed is a pretreatment composition comprising: (a) a Group IIIB and/or Group IVB metal; and (b) a compound containing at least six phosphorus-containing acid groups or salts thereof; wherein the molar ratio of (a) to (b) is at least 3:1; wherein the pretreatment composition is substantially free of silicon; and wherein the pretreatment composition is substantially free of Group VB metals.

Also disclosed is a method for treating a substrate comprising: contacting at least a portion of a surface of the substrate with a pretreatment composition according to the present invention as set forth above and described in more detail hereinafter.

Also disclosed are substrates treated with the pretreatment compositions.

BRIEF DESCRIPTION OF THE DRAWINGS

FIG. 1 illustrates the relationship between corrosion performance and the ratio of zirconium to phytic acid in the pretreatment composition.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" Group IIIB metal, "a" compound containing at least six phosphorous acid groups, and "an" electropositive metal, a combination (a plurality) of these components can be used in the present invention.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps.

As used herein, "consisting of" is understood in the context of this application to exclude the presence of any unspecified element, ingredient or method step.

As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a coating composition "applied onto" a substrate does not preclude the presence of one or more other intervening layers of the same or different composition located between the coating composition and the substrate.

As used herein, the term "dispersion" means a two-phase transparent, translucent or opaque resinous system having a continuous phase and a dispersed phase throughout in which the resin is the dispersed phase and the water is the continuous phase.

As used herein, "prerinse" or "prerinse composition" refers to a composition that, upon contact with a substrate, and when applied to the substrate prior to a pretreatment composition, activates the substrate surface for improved reaction with the pretreatment composition in order to enhance the corrosion protection of the pretreated substrate.

As used herein, "pretreatment composition" refers to a composition that is capable of reacting with and chemically altering the substrate surface and binding to it to form a film that affords corrosion protection.

As used herein, "pretreatment bath" refers to an aqueous bath containing the pretreatment composition and that may contain components that are byproducts of the process of contacting a substrate with the pretreatment composition.

As used herein, "sealer" or "sealer composition" refers to a composition, e.g. a solution or dispersion, that is capable of affecting a material deposited onto a substrate in such a way as to enhance its physical and/or chemical properties.

As used herein, the term "Group IIIB metal" refers to yttrium and scandium of the CAS version of the Periodic Table of the Elements as is shown, for example, in the Handbook of Chemistry and Physics, $63^{rd}$ edition (1983), corresponding to Group 3 in the actual IUPAC numbering, and includes elemental forms of such elements and compounds that contain at least one such element. For clarity, "Group IIIB metal" expressly excludes lanthanide series elements.

As used herein, the term "Group IVB metal" refers to an element that is in Group IVB of the CAS version of the Periodic Table of the Elements as is shown, for example, in the Handbook of Chemistry and Physics, $63^{rd}$ edition (1983), corresponding to Group 4 in the actual IUPAC numbering, and includes elemental forms of such elements and compounds that contain at least one such element.

As used herein, the term "Group VB metal" refers to an element that is in Group VB of the CAS version of the Periodic Table of the Elements as is shown, for example, in the Handbook of Chemistry and Physics, $63^{rd}$ edition (1983), corresponding to Group 5 in the actual IUPAC numbering, and includes elemental forms of such elements and compounds that contain at least one such element.

As used herein, the term "lanthanide series metals" refers to elements 57-71 of the CAS version of the Periodic Table of the Elements and includes elemental forms of the lanthanide series elements and compounds that contain at least one such element. According to the invention, the lanthanide series elements may be those which have both common oxidation states of +3 and +4, referred to hereinafter as +3/+4 oxidation states.

As used herein, the term "titanium metal" refers to element 22 of the CAS version of the Periodic Table of the Elements and includes elemental forms of such element and compounds that contain such element.

As used herein, the term "silicon" refers to element 14 of the CAS version of the Periodic Table of the Elements as is shown, for example, in the Handbook of Chemistry and Physics, $63^{rd}$ edition (1983) and includes elemental forms of such element and compounds that contain such element.

As used herein, a "metalloid" refers to silicon, boron, germanium, arsenic, antimony, tellurium, or polonium in their elemental forms or in compounds that contain at least one such element.

As used herein, the term "phosphorus-containing acid groups" refers to covalently bound groups derived from oxoacids of phosphorus.

As used herein, the term "oxidizing agent," when used with respect to a component of the pretreatment composition, refers to a chemical which is capable of oxidizing at least one of: a metal present in the substrate which is contacted by the pretreatment composition; and/or by-products that are present in the pretreatment bath as a result of treating a substrate therein. As used herein with respect to "oxidizing agent," the phrase "capable of oxidizing" means capable of removing electrons from an atom or a molecule present in the substrate or the pretreatment bath, as the case may be, thereby decreasing the number of electrons of such atom or molecule.

Unless otherwise disclosed herein, as used herein, the terms "total composition weight", "total weight of a composition" or similar terms refer to the total weight of all ingredients being present in the respective composition including any carriers and solvents.

Unless otherwise disclosed herein, as used herein, the term "substantially free" means that a particular material is not purposefully added to a composition, and, if present at all, only is present in a composition and/or layers comprising the same in a trace amount of 1 ppm or less, based on a total weight of the composition or layer(s), as the case may be. As used herein, unless otherwise disclosed, the term "completely free" means that a particular material is present in a composition and/or layers comprising the same in an amount of 1 ppb or less, based on a total weight of the composition or layer(s), as the case may be.

The pretreatment composition of the present invention comprises, or in some cases, consists essentially of, or in some cases, consists of, (a) a Group IIIB metal, a Group IVB metal, or combinations thereof; and (b) a compound containing at least six phosphorus-containing acid groups or salts thereof; wherein the molar ratio of (a) to (b) is at least 3:1.

As mentioned above, the pretreatment composition may comprise a Group IIIB and/or Group IVB metal. For example, the Group IIIB metal and/or Group IVB metal used in the pretreatment composition may be a compound of zirconium, titanium, hafnium, yttrium, scandium, or a mixture thereof. Suitable compounds of zirconium include, but are not limited to, hexafluorozirconic acid, alkali metal and ammonium salts thereof, ammonium zirconium carbonate, zirconyl nitrate, zirconyl sulfate, zirconium carboxylates and zirconium hydroxy carboxylates, such as zirconium acetate, zirconium oxalate, ammonium zirconium glycolate, ammonium zirconium lactate, ammonium zirconium citrate, and mixtures thereof. Suitable compounds of titanium include, but are not limited to, fluorotitanic acid and its salts. A suitable compound of hafnium includes, but is not limited to, hafnium nitrate. Suitable compounds of yttrium include, but are not limited to, yttrium halides.

According to the present invention, the Group IIIB metal and/or the Group IVB metal may be present in the pretreatment composition in a total amount of at least 20 ppm metal (calculated as elemental metal), based on total weight of the pretreatment composition, such as at least 50 ppm metal, or, in some cases, at least 70 ppm metal. According to the present invention, the Group IIIB metal and/or the Group IVB metal may be present in the pretreatment composition in a total amount of no more than 1000 ppm metal (calculated as elemental metal), based on total weight of the pretreatment composition, such as no more than 600 ppm metal, or, in some cases, no more than 300 ppm metal. According to the present invention, the Group IIIB metal and/or the Group IVB metal may be present in the pretreatment composition in a total amount of 20 ppm metal to 1000 ppm metal (calculated as elemental metal), based on total weight of the pretreatment composition, such as from 50 ppm metal to 600 ppm metal, such as from 70 ppm metal to 300 ppm metal. As used herein, the term "total amount," when used with respect to the amount of Group IIIB metal and/or Group IVB metal, means the sum of all Group IIIB and/or Group IV metals present in the pretreatment composition.

Optionally, according to the present invention, the pretreatment composition may contain no more than one Group IIIB metal or Group IVB metal, such that the pretreatment composition may contain one Group IIIB metal or Group IVB metal, and in some instances, may be substantially free, or in some instances, essentially free, or in some instances, completely free, of more than one Group IIIB and/or Group IVB metal. As used herein, the term "substantially free," when used with respect to more than one Group IIIB and/or Group IVB metal in the pretreatment composition, means that if more than one Group IIIB metal and/or Group IVB metal is present in the pretreatment composition, such Group IIIB and/or Group IVB metal is not purposefully added to the pretreatment composition, and, if present at all, only is present in the pretreatment composition and/or layers comprising the same in a trace amount of 5 ppm or less, based on a total weight of the composition or layer(s), as the case may be. As used herein, the term "essentially free," when used with respect to more than one Group IIIB and/or Group IVB metal in the pretreatment composition, means that if more than one Group IIIB or Group IVB metal is present in the pretreatment composition and/or layers comprising the same, such Group IIIB and/or Group IVB metal, if present at all, only is present in the pretreatment composition and/or layers comprising the same in an amount of 1 ppm or less, based on a total weight of the composition or layer(s), as the case may be. As used herein, the term "completely free," when used with respect to more than one Group IIIB and/or Group IVB metal in the pretreatment composition, means that only one Group IIIB or Group IVB metal is present in the pretreatment composition, that is, additional Group IIIB and/or Group IVB metals are present in the pretreatment composition and/or layers comprising the same in an amount of 1 ppb or less, based on a total weight of the composition or layer(s), as the case may be.

In some instances, the pretreatment composition according to the present invention may be substantially free, or, in some cases, completely free of titanium metal. As used herein, the term "substantially free," when used with respect to titanium metal in the pretreatment composition, means that titanium metal is not purposefully added to the pretreatment composition, and, if present at all, only is present in the pretreatment composition and/or layers comprising the same in a trace amount of 5 ppm or less, based on a total weight of the composition or layer(s), as the case may be. As used herein, the term "essentially free," when used with respect to titanium metal in the pretreatment composition, means that if titanium metal is present at all in the pretreatment composition and/or layers comprising the same, only is present in the pretreatment composition and/or layers comprising the same in an amount of 1 ppm or less, based on a total weight of the composition or layer(s), as the case may be. As used herein, the term "completely free," when used with respect to titanium metal in the pretreatment composition, means that titanium metal is present in the pretreatment composition and/or layers comprising the same in an amount of 1 ppb or less, based on a total weight of the composition or layer(s), as the case may be.

The pretreatment composition also may comprise a compound containing at least six phosphorus-containing acid groups or salts thereof, such as a compound containing at least six covalently bound acid groups of the structure —$P=O(OH)_2$ or salts thereof. The compound containing at least six phosphorus-containing acid groups or salts thereof can be a naturally occurring material such as phytic acid or salts thereof, or may be a synthetic material.

According to the present invention, the compound containing at least six phosphorus-containing acid groups or salts thereof may be present in the pretreatment composition in an amount of at least $1.82 \times 10^{-4}$ moles of phosphorous-containing acid groups per liter of pretreatment composition, such as at least $4.55 \times 10^{-4}$ moles/liter, such as at least $9.1 \times 10^{-4}$ moles/liter, such as at least $1.82 \times 10^{-3}$ moles per liter. According to the present invention, the compound containing at least six phosphorous containing acid groups or salts thereof may be present in the pretreatment composition in an amount of no more than $2.73 \times 10^{-2}$ moles of phosphorous-containing acid groups per liter of pretreatment composition, such as no more than $1.82 \times 10^{-2}$ moles per liter, such as no more than $1.1 \times 10^{-2}$ moles per liter, such as no more than $5.46 \times 10^{-3}$ moles per liter. According to the present invention, the compound containing at least six phosphorous-containing acid groups or salts thereof may be present in the pretreatment composition in an amount of from $1.82 \times 10^{-4}$ moles of phosphorous-containing acid groups per liter of pretreatment composition to $2.73 \times 10^{-2}$ moles of phosphorous-containing acid groups per liter of pretreatment composition, such as from $4.55 \times 10^{-4}$ moles/liter to $1.82 \times 10^{-2}$ moles per liter, such as from $9.1 \times 10^{-4}$ moles/liter to $1.1 \times 10^{-2}$ moles per liter, such as from $1.82 \times 10^{-3}$ moles per liter to $5.46 \times 10^{-3}$ moles per liter.

According to the present invention, the pretreatment composition also may comprise an electropositive metal ion. As used herein, the term "electropositive metal ion" refers to metal ions that will be reduced by the metal substrate being treated when the pretreatment solution contacts the surface of the metallic substrate. As will be appreciated by one skilled in the art, the tendency of chemical species to be reduced is called the reduction potential, is expressed in volts, and is measured relative to the standard hydrogen electrode, which is arbitrarily assigned a reduction potential of zero. The reduction potential for several elements is set forth in Table 1 below (according to the CRC $82^{nd}$ Edition, 2001-2002). An element or ion is more easily reduced than another element or ion if it has a voltage value, E*, in the following table, that is more positive than the elements or ions to which it is being compared.

TABLE 1

| Element | Reduction half-cell reaction | Voltage, E* |
|---|---|---|
| Potassium | $K^+ + e \rightarrow K$ | −2.93 |
| Calcium | $Ca^{2+} + 2e \rightarrow Ca$ | −2.87 |
| Sodium | $Na^+ + e \rightarrow Na$ | −2.71 |
| Magnesium | $Mg^{2+} + 2e \rightarrow Mg$ | −2.37 |
| Aluminum | $Al^{3+} + 3e \rightarrow Al$ | −1.66 |
| Zinc | $Zn^{2+} + 2e \rightarrow Zn$ | −0.76 |
| Iron | $Fe^{2+} + 2e \rightarrow Fe$ | −0.45 |
| Nickel | $Ni^{2+} + 2e \rightarrow Ni$ | −0.26 |
| Tin | $Sn^{2+} + 2e \rightarrow Sn$ | −0.14 |
| Lead | $Pb^{2+} + 2e \rightarrow Pb$ | −0.13 |
| Hydrogen | $2H^+ + 2e \rightarrow H_2$ | −0.00 |
| Copper | $Cu^{2+} + 2e \rightarrow Cu$ | 0.34 |
| Mercury | $Hg_2^{2+} + 2e \rightarrow 2Hg$ | 0.80 |
| Silver | $Ag^+ + e \rightarrow Ag$ | 0.80 |
| Gold | $Au^{3+} + 3e \rightarrow Au$ | 1.50 |

Thus, as will be apparent, when the metal substrate comprises one of the materials listed earlier, such as cold rolled steel, hot rolled steel, steel coated with zinc metal, zinc compounds, or zinc alloys, hot-dipped galvanized steel, galvanealed steel, steel plated with zinc alloy, aluminum alloys, aluminum plated steel, aluminum alloy plated steel, magnesium and magnesium alloys, suitable electropositive metals for deposition thereon include, for example, nickel, copper, silver, and gold, as well mixtures thereof.

According to the present invention, when the electropositive metal comprises copper, both soluble and insoluble compounds may serve as a source of copper ions in the pretreatment compositions. For example, the supplying source of copper ions in the pretreatment composition may be a water soluble copper compound. Specific examples of such compounds include, but are not limited to, copper cyanide, copper potassium cyanide, copper sulfate, copper nitrate, copper pyrophosphate, copper thiocyanate, disodium copper ethylenediaminetetraacetate tetrahydrate, copper bromide, copper oxide, copper hydroxide, copper chloride, copper fluoride, copper gluconate, copper citrate, copper lauroyl sarcosinate, copper formate, copper acetate, copper propionate, copper butyrate, copper lactate, copper oxalate, copper phytate, copper tartrate, copper malate, copper succinate, copper malonate, copper maleate, copper benzoate, copper salicylate, copper aspartate, copper glutamate, copper fumarate, copper glycerophosphate, sodium copper chlorophyllin, copper fluorosilicate, copper fluoroborate and copper iodate, as well as copper salts of carboxylic acids in the homologous series formic acid to decanoic acid, copper salts of polybasic acids in the series oxalic acid to suberic acid, and copper salts of hydroxycarboxylic acids, including glycolic, lactic, tartaric, malic and citric acids.

When copper ions supplied from such a water-soluble copper compound are precipitated as an impurity in the form of copper sulfate, copper oxide, etc., it may be desirable to add a complexing agent that suppresses the precipitation of copper ions, thus stabilizing them as a copper complex in the composition.

According to the present invention, the copper compound may be added as a copper complex salt such as $K_3Cu(CN)_4$ or Cu-EDTA, which can be present stably in the pretreatment composition on its own, but it is also possible to form a copper complex that can be present stably in the pretreatment composition by combining a complexing agent with a compound that is difficult to solubilize on its own. Examples thereof include a copper cyanide complex formed by a combination of CuCN and KCN or a combination of CuSCN and KSCN or KCN, and a Cu-EDTA complex formed by a combination of $CuSO_4$ and EDTA.2Na.

With regard to the complexing agent, a compound that can form a complex with copper ions can be used; examples thereof include inorganic compounds such as cyanide compounds and thiocyanate compounds, and polycarboxylic acids, and specific examples thereof include ethylenediaminetetraacetic acid, salts of ethylenediaminetetraacetic acid such as dihydrogen disodium ethylenediaminetetraacetate dihydrate, aminocarboxylic acids such as nitrilotriacetic acid and iminodiacetic acid, oxycarboxylic acids such as citric acid and tartaric acid, succinic acid, oxalic acid, ethylenediaminetetramethylenephosphonic acid, and glycine, and organophosphonates such as 1-hydroxethylidene-1,1-diphosphonic acid (commercially available from Italmatch Chemicals as Dequest 2010).

According to the present invention, the electropositive metal may be present in the pretreatment composition in an amount of at least 2 ppm (calculated as elemental metal), based on the total weight of the pretreatment composition, such as at least 4 ppm, such as at least 6 ppm, such as at least 8 ppm, such as at least 10 ppm. According to the present invention, the electropositive metal may be present in the pretreatment composition in an amount of no more than 100 ppm (calculated as elemental metal), based on the total weight of the pretreatment composition, such as no more than 80 ppm, such as no more than 60 ppm, such as no more than 40 ppm, such as no more than 20 ppm. According to the present invention, the electropositive metal may be present in the pretreatment composition in an amount of from 2 ppm to 100 ppm (calculated as elemental metal), based on the total weight of the pretreatment composition, such as from 4 ppm to 80 ppm, such as from 6 ppm to 60 ppm, such as from 8 ppm to 40 ppm, such as from 10 ppm to 20 ppm. The amount of electropositive metal in the pretreatment composition can range between the recited values inclusive of the recited values.

According to the present invention, a source of fluoride may be present in the pretreatment composition. As used herein the amount of fluoride disclosed or reported in the pretreatment composition is referred to a "total fluoride," as measured in part per millions of fluoride. The total fluoride in the pretreatment composition can be supplied by hydrofluoric acid, as well as alkali metal and ammonium fluorides or hydrogen fluorides. Additionally, total fluoride in the pretreatment composition may be derived from Group IIIB and/or Group IVB metals present in the pretreatment composition, including, for example, hexafluorozirconic acid or hexafluorotitanic acid. Other complex fluorides, such as $H_2SiF_6$ or $HBF_4$, can be added to the pretreatment composition to supply total fluoride. The skilled artisan will understand that when a pretreatment bath is prepared from the components of the pretreatment composition, the total fluoride will partition between being "bound fluoride" and "free fluoride." As used herein with respect to fluoride, "bound fluoride" refers to fluoride that is covalently or ionically bound to metal or hydrogen ions in solution, such as zirconium, and "free fluoride" refers to fluoride ions that are not bound to metal or hydrogen ions. As used herein, free fluoride is a bath parameter of the pretreatment bath that can be measured using a fluoride-ion selective electrode. The levels of free fluoride will depend on the pH and the addition of chelators into the pretreatment bath and indicates the degree of fluoride association with the metal ions/protons present in the pretreatment bath. For example, pretreatment compositions of identical total fluoride levels can have different free fluoride levels which will be influenced by the pH and chelators present in the pretreatment solution. The skilled artisan will understand that the presence of free fluoride in the pretreatment bath can impact pretreatment deposition and etching of the substrate.

In examples, the free fluoride may be measured as an operational parameter in the pretreatment bath using, for example, an Orion Dual Star Dual Channel Benchtop Meter equipped with a fluoride ion selective electrode ("ISE") available from Thermoscientific, the Symphony® Fluoride Ion Selective Combination Electrode supplied by VWR International, or similar electrodes. See, e.g., Light and Cappuccino, *Determination of fluoride in toothpaste using an ion-selective electrode*, J. Chem. Educ., 52:4, 247-250, April 1975. In examples, the fluoride ISE may be standardized by immersing the electrode into solutions of known fluoride concentration and recording the reading in millivolts, and then plotting these millivolt readings in a logarithmic graph. The millivolt reading of an unknown sample can then be compared to this calibration graph and the concentration of fluoride determined. Alternatively, the fluoride ISE can be used with a meter that will perform the calibration calculations internally and thus, after calibration, the concentration of the unknown sample can be read directly. Fluoride ion is a small negative ion with a high charge density, so in aqueous solution it is frequently complexed with metal ions having a high positive charge density, such as zirconium or titanium, or with hydrogen ion. The fluoride ions thus complexed are not measurable with the fluoride ISE unless the solution they are present in is mixed with an ionic strength adjustment buffer that releases the fluoride ions from such complexes. At that point the fluoride ions are measurable by the fluoride ISE, and the measurement is known as "total fluoride". A fluoride measurement taken without using such a reagent is known as "free fluoride", since it is only the fluoride ion not bound with hydrogen ion or in metal complexes.

According to the present invention, the total fluoride of the pretreatment composition may be present in an amount of at least 25 ppm, based on a total weight of the pretreatment composition, such as at least 100 ppm fluoride, such as at least 200 ppm fluoride. According to the present invention, the total fluoride of the pretreatment composition may be present in an amount of no more than 5000 ppm, based on a total weight of the pretreatment composition, such as no more than 2000 ppm fluoride, such as no more than 1000 ppm fluoride. According to the present invention, the total fluoride of the pretreatment composition may be present in an amount of 10 ppm fluoride to 5000 ppm fluoride, based on a total weight of the pretreatment composition, such as 100 ppm fluoride to 2000 ppm, such as no more than 200 ppm fluoride to 1000 ppm fluoride.

Optionally, according to the present invention, the pretreatment composition also may comprise an oxidizing agent. Non-limiting examples of the oxidizing agent include peroxides, persulfates, perchlorates, hypochlorite, nitrite, sparged oxygen, bromates, peroxi-benzoates, ozone, sodium nitrobenzene sulfonate, or combinations thereof.

The oxidizing agent may be present in the pretreatment composition in an amount of at least 10 ppm, based on total composition weight, such as at least 50 ppm, such as at least 75 ppm. The oxidizing agent may be present in the pretreatment composition in an amount of no more than 1000 ppm, based on total composition weight, such as no more than 500 ppm, such as no more than 250 ppm. The oxidizing agent may be present in the pretreatment composition in amounts of from 10 ppm to 1000 ppm, based on total composition weight, such as from 50 ppm to 500 ppm, such as from 75 ppm to 250 ppm.

Optionally, according to the present invention, the pretreatment composition may further comprise a source of phosphate ions. For clarity, when used herein, "phosphate ions" refers to phosphate ions that derive from or originate from inorganic phosphate compounds. For example, in some instances, phosphate ions may be present in an amount of greater than 5 ppm, based on total weight of the pretreatment composition, such as 10 ppm, such as 20 ppm. In some instances, phosphate ions may be present in an amount of no more than 60 ppm, based on total weight of the pretreatment composition, such as no more than 40 ppm, such as no more than 30 ppm. In some instances, phosphate ions may be present in an amount of from 5 ppm to 60 ppm, based on total weight of the pretreatment composition, such as from 10 ppm to 40 ppm, such as from 20 ppm to 30 ppm.

Alternatively, according to the present invention, the pretreatment composition may, in some instances, exclude phosphate ions or phosphate-containing compounds and/or the formation of sludge, such as aluminum phosphate, iron phosphate, and/or zinc phosphate, formed in the case of using a treating agent based on zinc phosphate. As used herein, "phosphate-containing compounds" include compounds containing the element phosphorous such as ortho phosphate, pyrophosphate, metaphosphate, tripolyphosphate, organophosphonates, and the like, and can include, but are not limited to, monovalent, divalent, or trivalent cations such as: sodium, potassium, calcium, zinc, nickel, manganese, aluminum and/or iron. When a composition and/or a layer or coating comprising the same is substantially free, essentially free, or completely free of phosphate, this includes phosphate ions or compounds containing phosphate in any form.

Thus, according to the present invention, pretreatment composition and/or layers deposited from the same may be substantially free, or in some cases may be essentially free, or in some cases may be completely free, of one or more of any of the ions or compounds listed in the preceding paragraph. A pretreatment composition and/or layers deposited from the same that is substantially free of phosphate means that phosphate ions or compounds containing phosphate are not intentionally added, but may be present in trace amounts, such as because of impurities or unavoidable contamination from the environment. In other words, the amount of material is so small that it does not affect the properties of the composition; this may further include that phosphate is not present in the pretreatment compositions and/or layers deposited from the same in such a level that they cause a burden on the environment. The term "substantially free" means that the pretreatment compositions and/or layers deposited from the same contain less than 5 ppm of any or all of the phosphate anions or compounds listed in the preceding paragraph, based on total weight of the composition or the layer, respectively, if any at all. The term "essentially free" means that the pretreatment compositions and/or layers comprising the same contain less than 1 ppm of any or all of the phosphate anions or compounds listed in the preceding paragraph. The term "completely free" means that the pretreatment compositions and/or layers comprising the same contain less than 1 ppb of any or all of the phosphate anions or compounds listed in the preceding paragraph, if any at all.

According to the present invention, the pretreatment composition may exclude chromium or chromium-containing compounds. As used herein, the term "chromium-containing compound" refers to materials that include hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, and strontium dichromate. When a pretreatment composition and/or a coating or a layer, respectively, deposited from the same is substantially free, essentially free, or completely free of chromium, this includes chromium in any form, such as, but not limited to, the hexavalent chromium-containing compounds listed above.

Thus, optionally, according to the present invention, the present pretreatment compositions and/or coatings or layers, respectively, deposited from the same may be substantially free, may be essentially free, and/or may be completely free of one or more of any of the elements or compounds listed in the preceding paragraph. A pretreatment composition and/or coating or layer, respectively, deposited from the same that is substantially free of chromium or derivatives thereof means that chromium or derivatives thereof are not intentionally added, but may be present in trace amounts, such as because of impurities or unavoidable contamination from the environment. In other words, the amount of material is so small that it does not affect the properties of the pretreatment composition; in the case of chromium, this may further include that the element or compounds thereof are not present in the pretreatment compositions and/or coatings or layers, respectively, deposited from the same in such a level that it causes a burden on the environment. The term "substantially free" means that the pretreatment compositions and/or coating or layers, respectively, deposited from the same contain less than 10 ppm of any or all of the elements or compounds listed in the preceding paragraph, based on total weight of the composition or the layer, respectively, if any at all. The term "essentially free" means that the pretreatment compositions and/or coatings or layers, respectively, deposited from the same contain less than 1 ppm of any or all of the elements or compounds listed in the preceding paragraph, if any at all. The term "completely free" means that the pretreatment compositions and/or coatings or layers, respectively, deposited from the same contain less than 1 ppb of any or all of the elements or compounds listed in the preceding paragraph, if any at all.

Optionally, according to the present invention, the pretreatment composition and/or layers deposited or formed therefrom may further comprise metalloids. Alternatively, the pretreatment composition of the present invention and/or layers deposited or formed therefrom may be substantially free, or, in some cases, completely free of metalloids.

Optionally, according to the present invention, the pretreatment composition of the present invention and/or layers deposited or formed therefrom may be substantially free, or, in some cases, completely free of Group VB metals.

Moreover, according to the present invention, the pretreatment composition and/or layers deposited or formed therefrom may further comprise organic materials in addition to the compound containing the at least six phosphorous acid groups. Alternatively, according to the present invention, the pretreatment composition and/or layers deposited or formed therefrom may be substantially free, or, in some cases, completely free of any organic materials other than the compound containing the at least six phosphorous acid groups.

According to the present invention, the molar ratio of (a) the Group IIIB and/or Group IVB metal(s) to (b) the compound containing the at least six phosphorus-containing acid groups or salts thereof is at least 3:1, such as at least 4:1, and may for instance be at least 5:1. According to the present invention, the molar ratio of (a) Group IIIB and/or Group IVB metal(s) to (b) the compound containing the at least six phosphorus-containing acid groups or salts thereof may be no more than 9:1, such as no more than 8:1, such as no more than 7:1. According to the present invention, the molar ratio of (a) Group IIIB and/or Group IVB metal(s) to (b) the compound containing the at least six phosphorus-containing acid groups or salts thereof may be from 3:1 to 9:1, such as from 4:1 to 8:1, such as from 5:1 to 7:1.

According to the present invention, the molar ratio of total metals to the compound containing the at least six phosphorus-containing acid groups or salts thereof may be at least 1:1, such as at least 1.5:1, such as at least 2:1. According to the present invention, the molar ratio of total metals to the compound containing the at least six phosphorus-containing acid groups or salts thereof may be no more than 400:1, such as no more than 100:1, such as no more than 8:1. According to the present invention, the molar ratio of total metals to the compound containing the at least six phosphorus-containing acid groups or salts thereof may be from 1:1 to 400:1, such as from 1.5:1 to 100:1, such as from 2:1 to 8:1. As used herein, the term "total metals," when used with respect to the molar ratio of total metals to the compound containing the at least six phosphorus-containing acid groups or salts thereof, refers to the molar ratio of Group IIIB metals, Group IVB metals, and/or electropositive metals in the pretreatment composition.

According to the present invention, the pH of the pretreatment composition may be, in some instances, 6.5 or less, such as 5.5 or less, such as 4.5 or less, such as 3.5 or less. According to the present invention, the pH of the pretreatment composition may, in some instances, range from 2.5 to 6.5, such as from 3.0 to 5.5, and may be adjusted and/or maintained by using, for example, any acid and/or base as is necessary. For example, according to the present invention, the pH of the composition may be maintained through the inclusion of an acidic material, including water soluble and/or water dispersible acids, such as nitric acid, sulfuric acid, and/or phosphoric acid. According to the present invention, the pH of the composition may be maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

According to the present invention, the pretreatment composition also may further comprise a resinous binder. Suitable resins include reaction products of one or more alkanolamines and an epoxy-functional material containing at least two epoxy groups, such as those disclosed in U.S. Pat. No. 5,653,823. In some cases, such resins contain beta hydroxy ester, imide, or sulfide functionality, incorporated by using dimethylolpropionic acid, phthalimide, or mercaptoglycerine as an additional reactant in the preparation of the resin. Alternatively, the reaction product can for instance be that of the diglycidyl ether of Bisphenol A (commercially available e.g. from Shell Chemical Company as EPON 880), dimethylol propionic acid, and diethanolamine in a 0.6 to 5.0:0.05 to 5.5:1 mole ratio. Other suitable resinous binders include water soluble and water dispersible polyacrylic acids such as those disclosed in U.S. Pat. Nos. 3,912,548 and 5,328,525; phenol formaldehyde resins such as those described in U.S. Pat. No. 5,662,746; water soluble polyamides such as those disclosed in WO 95/33869; copolymers of maleic or acrylic acid with allyl ether such as those described in Canadian patent application 2,087,352; and water soluble and dispersible resins including epoxy resins, aminoplasts, phenol-formaldehyde resins, tannins, and polyvinyl phenols such as those discussed in U.S. Pat. No. 5,449,415.

According to the present invention, the resinous binder often may be present in the pretreatment composition in an amount of 0.005 percent to 30 percent by weight, such as 0.5 to 3 percent by weight, based on the total weight of the composition. Alternatively, according to the present invention, the pretreatment composition may be substantially free or, in some cases, completely free of any resinous binder. As used herein, the term "substantially free", when used with reference to the absence of resinous binder in the pretreatment composition, means that, if present at all, any resinous binder is present in the pretreatment composition in a trace amount of less than 0.005 percent by weight, based on total weight of the composition. As used herein, the term "completely free" means that there is no resinous binder in the pretreatment composition at all.

The pretreatment composition may comprise an aqueous medium and may optionally contain other materials such as nonionic surfactants and auxiliaries conventionally used in the art of pretreatment. In the aqueous medium, water dispersible organic solvents, for example, alcohols with up to about 8 carbon atoms such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about ten percent by volume, based on the total volume of aqueous medium.

Other optional materials include surfactants that function as defoamers or substrate wetting agents. Anionic, cationic, amphoteric, and/or nonionic surfactants may be used. Defoaming surfactants may optionally be present at levels up to 1 weight percent, such as up to 0.1 percent by weight, and wetting agents are typically present at levels up to 2 percent, such as up to 0.5 percent by weight, based on the total weight of the pretreatment composition.

According to the invention, the composition also comprises a filler, such as a siliceous filler. Non-limiting examples of suitable fillers include silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. In addition to the siliceous fillers other finely divided particulate substantially water-insoluble fillers may also be employed. Examples of such optional fillers include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate.

Optionally, according to the present invention, the pretreatment composition and/or layers deposited or formed therefrom may further comprise silicon in amounts of at least 10 ppm, based on total weight of the pretreatment composition, such as at least 20 ppm, such as at least 50 ppm. According to the present invention, the pretreatment composition and/or layers deposited or formed therefrom may comprise silicon in amounts of less than 500 ppm, based on total weight of the pretreatment composition, such as less than 250 ppm, such as less than 100 ppm. According to the present invention, the pretreatment composition and/or layers deposited or formed therefrom may comprise silicon in amounts of 10 ppm to 500 ppm, based on total weight of the pretreatment composition, such as 20 ppm to 250 ppm, such as 50 ppm to 100 ppm. Alternatively, the pretreatment composition of the present invention and/or layers deposited or formed therefrom may be substantially free, or, in some cases, completely free of silicon.

As previously mentioned, the present disclosure also is directed to methods for treating a variety of substrates. Suitable substrates that may be used in the methods of the present invention include metal substrates, metal alloy substrates, and/or substrates that have been metallized, such as nickel plated plastic. According to the present invention, the metal or metal alloy can comprise or be cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 2XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, small metal parts, including fasteners, i.e., nuts, bolts, screws, pins, nails, clips, buttons, and the like, industrial structures and components such as appliances, including washers, dryers, refrigerators, stoves, dishwashers, and the like, agricultural equipment, lawn and garden equipment, air conditioning units, heat pump units, lawn furniture, and other articles. As used herein, "vehicle" or variations thereof includes, but is not limited to, civilian, commercial and military aircraft, and/or land vehicles such as cars, motorcycles, and/or trucks. Moreover, the metal substrate being treated by the methods of the present invention may be a cut edge of a substrate that is otherwise treated and/or coated over the rest of its surface. The metal substrate treated in accordance with the methods of the present invention may be in the form of, for example, a sheet of metal or a fabricated part.

As disclosed above, the methods of the present invention may comprise, or in some cases, consist essentially of, or in some cases, consist of, contacting at least a portion of a surface of the substrate with a pretreatment composition according to the present invention comprising, or in some cases, consisting essentially of, or in some cases, consisting of, (a) a Group IIIB metal and/or a Group IVB metal; and (b) a compound containing at least six phosphorus-containing acid groups or salts thereof; wherein the molar ratio of Group IIIB metals and/or Group IVB metals to the compound containing the at least six phosphorus-containing acid groups or salts thereof is at least 3:1.

The metal substrate to be treated in accordance with the methods of the present invention may be cleaned prior to contacting at least a portion of the substrate surface with the pretreatment composition, in order to remove grease, dirt, and/or other extraneous matter. At least a portion of the surface of the substrate may be cleaned by physical and/or chemical means, such as mechanically abrading the surface and/or cleaning/degreasing the surface with commercially available alkaline or acidic cleaning agents that are well known to those skilled in the art. Examples of alkaline cleaners suitable for use in the present invention include Chemkleen™ 163, 177, 611L, 490MX, 2010LP, and 181ALP, Ultrax 32, Ultrax 97, and Ultrax 94D, each of which are commercially available from PPG Industries, Inc. Such cleaners are often preceded or followed by a water rinse, such as with tap water, distilled water, or combinations thereof.

Following the cleaning step, the substrate optionally may be rinsed with tap water, deionized water, and/or an aqueous solution of rinsing agents in order to remove any residue. According to the present invention, the wet substrate surface may be treated with a pre-rinse composition (described below) and/or the pretreatment composition (described above), or the substrate may be dried prior to treating the substrate surface, such as air dried, for example, by using an air knife, by flashing off the water by brief exposure of the substrate to a high temperature, 15° C. to 200° C., such as for 10 minutes at 70° C., or by passing the substrate between squeegee rolls.

Optionally, according to the present invention, prior to contacting the substrate with the pretreatment composition, the substrate may be contacted with a pre-rinse composition. According to the present invention, the pre-rinse composition may comprise a fluoride source. As used herein the amount of fluoride disclosed or reported in the pre-rinse composition is referred to a "total fluoride," as measured in part per millions of fluoride.

Often, the pre-rinse composition may comprise a carrier, often an aqueous medium, so that the pre-rinse composition is in the form of a solution or dispersion of the free fluoride source in the carrier. In such instances, the solution or dispersion may be brought into contact with the substrate by any of a variety of known techniques, such as dipping or immersion, spraying, intermittent spraying, dipping followed by spraying, spraying followed by dipping, brushing, or roll-coating. According to the present invention, the solution or dispersion when applied to the metal substrate is at a temperature ranging from 50 to 200° F., such as from 75-125° F. For example, the pre-rinse process may be carried out at ambient or room temperature. The contact time is often from 15 seconds to 10 minutes, such as 30 seconds to 2 minutes.

The pH of the pre-rinse composition may be below 7, such as 2.5 to 5, and may be adjusted by varying the amount of the dissolved complex metal fluoride ion present in the composition, or may be adjusted using, for example, any acid or base as is necessary. For example, the pH of the pre-rinse composition may be maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or combinations thereof.

The total fluoride in the pre-rinse composition can be supplied by hydrofluoric acid, as well as alkali metal and ammonium fluorides or hydrogen fluorides. Additionally, total fluoride in the pre-rinse composition may be derived from Group IIIB and/or Group IVB metals present in the pretreatment composition, including, for example, hexafluorozirconic acid or hexafluorotitanic acid. Other complex fluorides, such as $H_2SiF_6$ or $HBF_4$, can be added to the pre-rinse composition to supply total fluoride. The skilled artisan will understand that when a bath containing the pre-rinse composition bath is prepared, the total fluoride will partition between being "bound fluoride" and "free fluoride," as those terms are defined above and measured as described above.

The free fluoride source may be present in the pre-rinse composition in an amount of at least 10 ppm, based on a total weight of the pre-rinse composition, such as at least 100 ppm. The free fluoride source may be present in the pre-rinse composition in an amount of no more than 5000 ppm, based on a total weight of the pre-rinse composition, such as at least 2000 ppm. The free fluoride source may be present in the pre-rinse composition in an amount of 10 ppm to 5000 ppm, based on total weight of the pre-rinse composition, such as 100 ppm to 2000 ppm.

As discussed above, according to the present invention, at least a portion of a surface of the substrate, with or without the optional pre-rinse, may be contacted with the pretreatment composition comprising a Group IIIB metal and/or IVB metal and the compound containing at least six phosphorus-containing acid groups or salts thereof.

The pretreatment composition may comprise a carrier, often an aqueous medium, so that the composition is in the form of a solution or dispersion of the Group IIIB metal and/or the Group IVB metal and the compound containing at least six phosphorus-containing acid groups or salts thereof in the carrier. In these embodiments, the solution or dispersion may be brought into contact with the substrate by any of a variety of known techniques, such as dipping or immersion, spraying, intermittent spraying, dipping followed by spraying, spraying followed by dipping, brushing, or roll-coating. According to the invention, the solution or dispersion when applied to the metal substrate is at a temperature ranging from 60 to 185° F. (15 to 85° C.). For example, the pretreatment process may be carried out at ambient or room temperature. The contact time is often from 10 seconds to 5 minutes, such as 30 seconds to 2 minutes.

Following the contacting with the pretreatment composition, the substrate may be rinsed with tap water, deionized water, and/or an aqueous solution of rinsing agents in order to remove any residue. The substrate optionally may be dried, for example air dried or dried with hot air, for example, by using an air knife, by flashing off the water by brief exposure of the substrate to a high temperature, such as by drying the substrate in an oven at 15° C. to 200° C. or in a heater assembly using, for example, infrared heat, such as for 10 minutes at 70° C., or by passing the substrate between squeegee rolls.

According to the present invention the film coverage of the residue of the pretreatment coating composition generally ranges typically from 1 to 1000 milligrams per square meter ($mg/m^2$), for example, from 10 to 400 $mg/m^2$. The thickness of the pretreatment coating may for instance be less than 1 micrometer, for example from 1 to 500 nanometers, or from 10 to 300 nanometers. Coating weights may be determined by removing the film from the substrate and determining the elemental composition using a variety of analytical techniques (such as XRF, ICP, etc.). Pretreatment thickness can be determined using a handful of analytical techniques including, but not limited to XPS depth profiling or TEM.

Optionally, after the pretreatment step, at least a portion of the surface of the substrate that has been contacted with the pretreatment composition may then be contacted with a sealer composition. Sealer compositions, in general, utilize certain solubilized metal ions and/or other inorganic materials (such as phosphates or simple or complex fluorides) to enhance the corrosion protection of pretreated metal substrates. These sealer compositions may be chrome containing or non-chrome containing compositions. Suitable non-chrome sealer compositions that may be utilized in the present invention include, for example, those comprising: silanes or organosilanes; (a) the reaction product of an epoxy-functional material having at least two epoxy groups and at least one alkanolamine; and (b) a Group IVB metal ion (such as is disclosed in U.S. Pat. No. 5,653,823, assigned to PPG Industries, Inc. and incorporated herein by reference); those comprising (a) an amino compound which is an amino acid, an amino alcohol or a salt thereof, and (b) a Group IIIB or IVB transition metal compound or rare earth metal compound (such as is disclosed in U.S. Pat. No. 5,209,788, assigned to PPG Industries, Inc. and incorporated herein by reference); and those comprising an S-triazine having at least one hydroxyl group on a carbon atom of the triazine ring (such as is disclosed in U.S. Pat. No. 5,149,382 (assigned to PPG Industries, Inc. and incorporated herein by reference). In addition, organic materials (resinous or otherwise) such as phosphatized epoxies, base-solubilized, carboxylic acid containing polymers, at least partially neutralized interpolymers of hydroxyl-alkyl esters of unsaturated carboxylic acids, and amine salt-group containing resins (such as acid-solubilized reaction products of polyepoxides and primary or secondary amines) may also be utilized alone or in combination with solubilized metal ions and/or other inorganic materials. After the optional sealer composition (when utilized), the substrate may be rinsed with tap and/or deionized water, and optionally dried (as described above) prior to subsequent processing.

According to the present invention, after the substrate is contacted with the pretreatment composition and optionally, the sealer composition, a coating composition comprising a film-forming resin may be deposited onto at least a portion of the surface of the substrate that has been contacted with the pretreatment composition, and optionally the sealer composition, as the case may be. Any suitable technique may be used to deposit such a coating composition onto the substrate, including, for example, brushing, dipping, flow coating, spraying and the like. In some instances, however, as described in more detail below, such depositing of a coating composition may comprise an electrocoating step wherein an electrodepositable composition is deposited onto a metal substrate by electrodeposition. In certain other instances, as described in more detail below, such depositing of a coating composition comprises a powder coating step. In still other instances, the coating composition may be a liquid coating composition.

According to the present invention, the coating composition may comprise a thermosetting film-forming resin or a thermoplastic film-forming resin. As used herein, the term "film-forming resin" refers to resins that can form a self-supporting continuous film on at least a horizontal surface of a substrate upon removal of any diluents or carriers present in the composition or upon curing at ambient or elevated temperature. Conventional film-forming resins that may be used include, without limitation, those typically used in automotive OEM coating compositions, automotive refinish coating compositions, industrial coating compositions, architectural coating compositions, coil coating compositions, and aerospace coating compositions, among others. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or crosslinking reactions also may be carried out under ambient conditions. Once cured or crosslinked, a thermosetting resin will not melt upon the application of heat and is insoluble in solvents. As used herein, the term "thermoplastic" refers to resins that comprise polymeric components that are not joined by covalent bonds and thereby can undergo liquid flow upon heating and are soluble in solvents.

As previously indicated, according to the present invention, a coating composition comprising a film-forming resin may be deposited onto the substrate by an electrocoating step wherein an electrodepositable composition is deposited onto the metal substrate by electrodeposition. In the process of electrodeposition, the metal substrate being treated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate.

According to the present invention, such electrodeposition may be carried out at a constant voltage in the range of from 1 volt to several thousand volts, typically between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film.

According to the present invention, the electrodepositable coating composition may comprise a resinous phase dispersed in an aqueous medium wherein the resinous phase comprises: (a) an active hydrogen group-containing ionic electrodepositable resin, and (b) a curing agent having functional groups reactive with the active hydrogen groups of (a).

According to the present invention, the electrodepositable compositions may contain for instance, as a main film-forming polymer, an active hydrogen-containing ionic, often cationic, electrodepositable resin. A wide variety of electrodepositable film-forming resins are known and can be used in the present invention so long as the polymers are "water dispersible," i.e., adapted to be solubilized, dispersed or emulsified in water. The water dispersible polymer is ionic in nature, that is, the polymer will contain anionic functional groups to impart a negative charge or may contain cationic functional groups to impart a positive charge.

Examples of film-forming resins suitable for use in anionic electrodepositable coating compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Still another suitable electrodepositable film-forming resin comprises an alkyd-aminoplast vehicle, i.e., a vehicle containing an alkyd resin and an amine-aldehyde resin. Yet another anionic electrodepositable resin composition comprises mixed esters of a resinous polyol, such as is described in U.S. Pat. No. 3,749,657 at col. 9, lines 1 to 75 and col. 10, lines 1 to 13, the cited portion of which being incorporated herein by reference. Other acid functional polymers can also be used, such as phosphatized polyepoxide or phosphatized acrylic polymers as are known to those skilled in the art.

As aforementioned, it is often desirable that the active hydrogen-containing ionic electrodepositable resin (a) is cationic and capable of deposition on a cathode. Examples of such cationic film-forming resins include amine salt group-containing resins, such as the acid-solubilized reaction products of polyepoxides and primary or secondary amines, such as those described in U.S. Pat. Nos. 3,663,389; 3,984,299; 3,947,338; and 3,947,339. Often, these amine salt group-containing resins are used in combination with a blocked isocyanate curing agent. The isocyanate can be fully blocked, as described in U.S. Pat. No. 3,984,299, or the isocyanate can be partially blocked and reacted with the resin backbone, such as is described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins, such as those described in U.S. Pat. Nos. 3,455,806 and 3,928,157.

Besides amine salt group-containing resins, quaternary ammonium salt group-containing resins can also be employed, such as those formed from reacting an organic polyepoxide with a tertiary amine salt as described in U.S. Pat. Nos. 3,962,165; 3,975,346; and 4,001,101. Examples of other cationic resins are ternary sulfonium salt group-containing resins and quaternary phosphonium salt-group containing resins, such as those described in U.S. Pat. Nos. 3,793,278 and 3,984,922, respectively. Also, film-forming resins which cure via transesterification, such as described in European Application No. 12463 can be used. Further, cationic compositions prepared from Mannich bases, such as described in U.S. Pat. No. 4,134,932, can be used.

According to the present invention, the resins present in the electrodepositable composition are positively charged resins which contain primary and/or secondary amine groups, such as described in U.S. Pat. Nos. 3,663,389; 3,947,339; and 4,116,900. In U.S. Pat. No. 3,947,339, a polyketimine derivative of a polyamine, such as diethylenetriamine or triethylenetetraamine, is reacted with a polyepoxide. When the reaction product is neutralized with acid and dispersed in water, free primary amine groups are generated. Also, equivalent products are formed when polyepoxide is reacted with excess polyamines, such as diethylenetriamine and triethylenetetraamine, and the excess polyamine vacuum stripped from the reaction mixture, as described in U.S. Pat. Nos. 3,663,389 and 4,116,900.

According to the present invention, the active hydrogen-containing ionic electrodepositable resin may be present in the electrodepositable composition in an amount of 1 to 60 percent by weight, such as 5 to 25 percent by weight, based on total weight of the electrodeposition bath.

As indicated, the resinous phase of the electrodepositable composition often further comprises a curing agent adapted to react with the active hydrogen groups of the ionic electrodepositable resin. For example, both blocked organic polyisocyanate and aminoplast curing agents are suitable for use in the present invention.

Aminoplast resins may be used as the curing agent for anionic electrodeposition, are the condensation products of amines or amides with aldehydes. Examples of suitable amines or amides are melamine, benzoguanamine, urea and similar compounds. Generally, the aldehyde employed is formaldehyde, although products can be made from other aldehydes, such as acetaldehyde and furfural. The condensation products contain methylol groups or similar alkylol groups depending on the particular aldehyde employed. Often, these methylol groups are etherified by reaction with an alcohol, such as a monohydric alcohol containing from 1 to 4 carbon atoms, such as methanol, ethanol, isopropanol, and n-butanol. Aminoplast resins are commercially available from American Cyanamid Co. under the trademark CYMEL and from Monsanto Chemical Co. under the trademark RESIMENE.

The aminoplast curing agents are often utilized in conjunction with the active hydrogen containing anionic electrodepositable resin in amounts ranging from 5 percent to 60 percent by weight, such as from 20 percent to 40 percent by weight, the percentages based on the total weight of the resin solids in the electrodepositable composition. As indicated, blocked organic polyisocyanates are often used as the curing agent in cathodic electrodeposition compositions. The polyisocyanates can be fully blocked as described in U.S. Pat. No. 3,984,299 at col. 1, lines 1 to 68, col. 2, and col. 3, lines 1 to 15, or partially blocked and reacted with the polymer backbone as described in U.S. Pat. No. 3,947,338 at col. 2, lines 65 to 68, col. 3, and col. 4 lines 1 to 30, the cited portions of which being incorporated herein by reference. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates can be used. An example would include triphenylmethane-4,4',4"-triisocyanate. Isocyanate prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from 5 percent to 60 percent by weight, such as from 20 percent to 50 percent by weight, the percentages based on the total weight of the resin solids of the electrodepositable composition.

The electrodepositable coating compositions described herein may in particular be in the form of an aqueous dispersion. The average particle size of the resinous phase is generally less than 1.0 micron and usually less than 0.5 microns, often less than 0.15 micron.

The concentration of the resinous phase in the aqueous medium is often at least 1 percent by weight, such as from 2 to 60 percent by weight, based on total weight of the aqueous dispersion. When such coating compositions are in the form of resin concentrates, they generally have a resin solids content of 20 to 60 percent by weight based on weight of the aqueous dispersion.

The electrodepositable coating compositions described herein are often supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more colorants (described below), a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

As aforementioned, besides water, the aqueous medium may contain a coalescing solvent. Useful coalescing solvents are often hydrocarbons, alcohols, esters, ethers and ketones. Coalescing solvents that may be used may be alcohols, polyols and ketones. Specific coalescing solvents include isopropanol, butanol, 2-ethylhexanol, isophorone, 2-methoxypentanone, ethylene and propylene glycol and the monoethyl monobutyl and monohexyl ethers of ethylene glycol. The amount of coalescing solvent is generally between 0.01 and 25 percent, such as from 0.05 to 5 percent by weight based on total weight of the aqueous medium.

After deposition of the electrodepositable coating composition, the coating is often heated to cure the deposited composition. The heating or curing operation is often carried out at a temperature in the range of from 120 to 250° C., such as from 120 to 190° C., for a period of time ranging from 10 to 60 minutes. According to the invention, the thickness of the resultant film is from 10 to 50 microns.

Alternatively, as mentioned above, according to the present invention, after the substrate has been contacted with the pretreatment composition, and optionally with a sealer composition, a powder coating composition may then be deposited onto at least a portion of the surface of the substrate that has been contacted with the pretreatment composition, and optionally the sealer composition, as the case may be. As used herein, "powder coating composition" refers to a coating composition which is completely free of water and/or solvent. Accordingly, the powder coating composition disclosed herein is not synonymous to waterborne and/or solvent-borne coating compositions known in the art.

According to the present invention, the powder coating composition comprises (a) a film forming polymer having a reactive functional group; and (b) a curing agent that is reactive with the functional group. Examples of powder coating compositions that may be used in the present invention include the polyester-based ENVIROCRON line of powder coating compositions (commercially available from PPG Industries, Inc.) or epoxy-polyester hybrid powder coating compositions. Alternative examples of powder coating compositions that may be used in the present invention include low temperature cure thermosetting powder coating compositions comprising (a) at least one tertiary aminourea compound, at least one tertiary aminourethane compound, or mixtures thereof, and (b) at least one film-forming epoxy-containing resin and/or at least one siloxane-containing resin (such as those described in U.S. Pat. No. 7,470,752, assigned to PPG Industries, Inc. and incorporated herein by reference); curable powder coating compositions generally comprising (a) at least one tertiary aminourea compound, at least one tertiary aminourethane compound, or mixtures thereof, and (b) at least one film-forming epoxy-containing resin and/or at least one siloxane-containing resin (such as those described in U.S. Pat. No. 7,432,333, assigned to PPG Industries, Inc. and incorporated herein by reference); and those comprising a solid particulate mixture of a reactive group-containing polymer having a $T_g$ of at least 30° C. (such as those described in U.S. Pat. No. 6,797,387, assigned to PPG Industries, Inc. and incorporated herein by reference).

Suitable film forming polymers that may be used in the powder coating composition of the present invention comprise a (poly)ester (e.g., polyester triglycidyl isocyanurate), a (poly)urethane, an isocyanurate, a (poly)urea, a (poly) epoxy, an anhydride, an acrylic, a (poly)ether, a (poly) sulfide, a (poly)amine, a (poly)amide, (poly)vinyl chloride, (poly)olefin, (poly)vinylidene fluoride, or combinations thereof.

According to the present invention, the reactive functional group of the film forming polymer of the powder coating composition comprises hydroxyl, carboxyl, isocyanate (including blocked (poly)isocyanate), primary amine, secondary amine, amide, carbamate, urea, urethane, vinyl, unsaturated ester, maleimide, fumarate, anhydride, hydroxyl alkylamide, epoxy, or combinations thereof.

Suitable curing agents (crosslinking agents) that may be used in the powder coating composition of present invention comprise an aminoplast resin, a polyisocyanate, a blocked polyisocyanate, a polyepoxide, a polyacid, a polyol, or combinations thereof.

After deposition of the powder coating composition, the coating is often heated to cure the deposited composition. The heating or curing operation is often carried out at a temperature in the range of from 150° C. to 200° C., such as from 170° C. to 190° C., for a period of time ranging from 10 to 20 minutes. According to the invention, the thickness of the resultant film is from 50 microns to 125 microns.

As mentioned above, the coating composition may be a liquid coating composition. As used herein, "liquid coating composition" refers to a coating composition which contains a portion of water and/or solvent. Accordingly, the liquid coating composition disclosed herein is synonymous to waterborne and/or solventborne coating compositions known in the art.

As mentioned above, according to the present invention, the coating composition may be a liquid coating composition. As used herein, "liquid coating composition" refers to a coating composition which contains a portion of water and/or solvent. Accordingly, the liquid coating composition disclosed herein is synonymous to waterborne and/or solventborne coating compositions known in the art.

According to the present invention, the liquid coating composition may comprise, for example, (a) a film forming polymer having a reactive functional group; and (b) a curing agent that is reactive with the functional group. In other examples, the liquid coating may contain a film forming polymer that may react with oxygen in the air or coalesce into a film with the evaporation of water and/or solvents. These film forming mechanisms may require or be accelerated by the application of heat or some type of radiation such as Ultraviolet or Infrared. Examples of liquid coating compositions that may be used in the present invention include the SPECTRACRON® line of solventbased coating compositions, the AQUACRON® line of waterbased coating compositions, and the RAYCRON® line of UV cured coatings (all commercially available from PPG Industries, Inc.).

Suitable film forming polymers that may be used in the liquid coating composition of the present invention may comprise a (poly)ester, an alkyd, a (poly)urethane, an isocyanurate, a (poly)urea, a (poly)epoxy, an anhydride, an acrylic, a (poly)ether, a (poly)sulfide, a (poly)amine, a (poly)amide, (poly)vinyl chloride, (poly)olefin, (poly)vinylidene fluoride, (poly)siloxane, or combinations thereof.

According to the present invention, the reactive functional group of the film forming polymer of the liquid coating composition may comprise hydroxyl, carboxyl, isocyanate (including blocked (poly)isocyanate), primary amine, secondary amine, amide, carbamate, urea, urethane, vinyl, unsaturated ester, maleimide, fumarate, anhydride, hydroxyl alkylamide, epoxy, or combinations thereof.

Suitable curing agents (crosslinking agents) that may be used in the liquid coating composition of the present invention may comprise an aminoplast resin, a polyisocyanate, a blocked polyisocyanate, a polyepoxide, a polyacid, a polyol, or combinations thereof.

In addition, a colorant and, if desired, various additives such as surfactants, wetting agents or catalyst can be included in the coating composition (electrodepositable, powder, or liquid). As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm Nanoparticles can be produced by milling stock organic or inorganic pigments with grinding media having a particle size of less than 0.5 mm Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. Pat. Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. According to the invention, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the invention, a photosensitive composition and/or photochromic composition, which reversibly alters its color when exposed to one or more light sources, can be used. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. According to the invention, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

According to the invention, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in according to the invention, have minimal migration out of the coating. Example photosensitive compositions and/or photochromic compositions and methods for making them are identified in U.S. patent application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

In view of the foregoing description the present invention thus relates in particular, without being limited thereto, to the following Aspects 1-15:

1. A pretreatment composition comprising:
   (a) a Group IIIB metal and/or a Group IVB metal; and
   (b) a compound containing at least six phosphorus-containing acid groups or salts thereof; wherein the molar ratio of (a) to (b) is at least 3:1;
   wherein said pretreatment composition:
      (A) comprises the Group IIIB metal and/or Group IVB metal in a total amount of 20 ppm to 1000 ppm (calculated as elemental metal) based on the total weight of the pretreatment composition and comprises the compound containing at least six phosphorus-containing acid groups or salts thereof in an amount of from $1.82 \times 10^{-4}$ moles per liter to $2.73 \times 10^{-2}$ moles per liter of pretreatment composition; and/or
      (B) is substantially free of silicon and is substantially free of Group VB metals.
2. The pretreatment composition according to Aspect 1, comprising 1 ppm or less of silicon and 1 ppm or less of Group VB metals, each based on the total weight of the pretreatment composition, when the pretreatment composition is substantially free of silicon and substantially free of Group VB metals.
3. The pretreatment composition according to Aspect 1 or 2, wherein the Group IIIB metal and/or Group IVB metal comprise(s) zirconium, titanium, hafnium, yttrium, scandium, or a mixture thereof.
4. The pretreatment composition according to Aspect 3, wherein the Group IIIB metal and/or Group IVB metal comprise(s) a compound of zirconium, titanium, hafnium, yttrium, scandium, or a mixture thereof, preferably comprising hexafluorozirconic acid.
5. The pretreatment composition according to any one of the preceding Aspects, wherein the compound containing at least six phosphorus-containing acid groups or salts thereof comprises phytic acid or salts thereof.
6. The pretreatment according to any one of the preceding Aspects, further comprising a fluoride source, an electropositive metal, an oxidizing agent, or a combination thereof, wherein preferably the molar ratio of Group IIIB, Group IVB, and electropositive metals to the compound containing at least six phosphorus-containing acid groups is greater than 3:1.
7. The pretreatment composition according to Aspect 6, comprising an electropositive metal, preferably copper, in ionic form in an amount of 2 ppm to 100 ppm (calculated as elemental metal) based on the total weight of the pretreatment composition.
8. The pretreatment composition according to Aspect 6 or 7, comprising a fluoride source in an amount of 25 ppm to 500 ppm based on the total weight of the pretreatment composition.
9. The pretreatment composition according to Aspect 6, 7 or 8, comprising an oxidizing agent, preferably an oxidizing agent comprising a metal source, in an amount of 10 ppm to 1000 ppm based on the total weight of the pretreatment composition.
10. A method for treating a substrate comprising:
    contacting at least a portion of a surface of the substrate with a pretreatment composition according to any one of Aspects 1 to 9.
11. The method according to Aspect 10, further comprising contacting at least a portion of the surface that has been contacted with the pretreatment composition with a sealer composition, wherein the sealer composition preferably comprises a Group IIIB metal, a Group IVB metal, a lanthanide, silica, aluminum, silane, an organosilane, or a combination thereof, said method optionally further comprising depositing a coating composition comprising a film-forming resin onto at least a portion of the surface that has been contacted with the sealer composition, said method optionally further comprising contacting the surface with a pre-rinse composition prior to contacting at least a portion of the surface of the substrate with the pretreatment composition.
12. The method according to Aspect 10, further comprising depositing a coating composition comprising a film-forming resin onto at least a portion of the surface that has been contacted with the pretreatment composition.
13. A treated metal substrate comprising:
    a pretreatment layer formed on at least a portion of a surface of the substrate by contacting the surface of the substrate with a pretreatment composition according to any one of Aspects 1 to 9.
14. The treated metal substrate according to Aspect 13 further comprising a sealer layer formed on at least a portion of the pretreatment layer, wherein the sealer layer preferably comprises a Group IIIB metal, a Group IVB metal, a lanthanide, silica, aluminum, silane, an organosilane, or a combination thereof, said treated metal substrate optionally further comprising a coating derived from a coating composition comprising a film-forming resin deposited over at least a portion of the layer formed by the sealer composition.
15. The treated metal substrate according to Aspect 13 further comprising a coating derived from a coating composition comprising a film-forming resin deposited over at least a portion of the layer formed by the pretreatment composition.

Whereas particular features of the present invention have been described above for purposes of illustration, it will be evident to those skilled in the art that numerous variations of the details of the coating composition, coating, and methods disclosed herein may be made without departing from the scope in the appended claims.

Illustrating the invention are the following examples that are not to be considered as limiting the invention to their details. All parts and percentages in the examples, as well as throughout the specification, are by weight unless otherwise indicated.

EXAMPLES

In Examples 1-8, where water rinses were applied by a spray method, compositions were applied by a hose with a standard spray head and cleaners were apply by a spray method using flat spray nozzles having a pressure of 10-20 psi with nozzle capacities of 2.5 to 5.0 gallons per minute per nozzle. Pre-rinse compositions, pretreatment compositions and sealer compositions were applied by immersion of panels in a 5 gallon bucket containing such composition.

In the following Examples 9-22, where cleaners, water rinses, pre-rinse compositions, or sealer compositions were applied by a spray method, flat spray nozzles were used to apply such compositions. Nozzle spray pressure was 10-20 psi with nozzle capacities of 2.5 to 5.0 gallons per minute per nozzle. Hollow cone nozzles were used to apply pretreatment compositions. Nozzle spray pressure was 10-15 psi with nozzle capacities of 2.5 to 3.5 gallons per minute per nozzle.

Examples 1-8

In order to determine the effect of a pretreatment composition containing zirconium and phytic acid on corrosion performance, panels in Examples 1-8 were treated with pretreatment compositions containing a range of concentrations of zirconium and/or phytic acid and copper, and corrosion performance was compared to panels pretreated with either zirconium and copper (i.e., no phytic acid) or with zinc phosphate. In Examples 1-8, the pretreatment composition was applied by immersing the panels in a bath containing the pretreatment composition, as described in more detail below. In Example 6, the pretreatment composition included a reaction accelerator. In Examples 7 and 8, the panels were treated with a sealer composition prior to painting the panels with the electrodepositable coating composition.

In all Examples, where reported, free fluoride was measured as an operational parameter in the pretreatment bath using an Orion Dual Star Dual Channel Benchtop Meter equipped with a fluoride selective electrode available from Thermoscientific.

A summary of the pretreatment compositions and treatment protocols for panels used in Examples 1 to 8 is provided in Table 2. Details of the protocol followed for each Example are provided below.

PPG Industries, Inc., Cleveland, Ohio) and 0.13 wt % Chemkleen 181ALP (commercially available from PPG Industries, Inc.) in deionized water.

The pretreatment composition was prepared by adding 10.8 g hexafluorozirconic acid (45% w/w in water), 11.6 g copper nitrate solution (2% copper w/w in deionized water) and 12.2 g phytic acid solution (40-50% w/w in water, Acros-Organics) to 11 liters of deionized water. The pH was adjusted to 4.0 with Chemfil Buffer (an alkaline buffering solution, commercially available PPG Industries, Inc.). The zirconium level was approximately 190 ppm (calculated), the copper was 21 ppm (calculated), the phytic acid was 500 ppm (calculated), the total fluoride was 237 ppm (calculated) and the free fluoride was measured to be 65 ppm using a fluoride ISE. See Table 2.

All panels were immersed in the pretreatment composition for 2 minutes at ambient temperature, rinsed with deionized water for 30 seconds, and dried with hot air (130° F. [54° C.].

All panels were painted via electrodeposition using a cathodic epoxy paint Powercron 6000CX commercially available from PPG Industries. The paint was deposited using a voltage of approximately 200V, and following which they were cured for 25 minutes at 350° F. (177° C.).

TABLE 2

Pretreatment Compositions and Treatment Protocols for Examples 1 to 8

| EXAMPLE | Metal[1] (ppm) | Zr[2] (ppm) | PA[3] (ppm) | Zr:PA[4] (molar ratio) | Cu[5] (ppm) | Total Fluoride[6] (ppm) | Reaction accelerator[7] (ppm) | pH[8] | Seal[9] (ppm) |
|---|---|---|---|---|---|---|---|---|---|
| 1 | — | 190 | 500 | 2.7:1 | 21 | 237 | — | 4.0 | — |
| 2 (comp.)* | — | 190 | — | — | 21 | 274 | — | 4.5 | — |
| 3 (comp.)* | 1000 (Zn) 900 (Mn) 350 (Ni) | — | — | — | — | — | — | — | — |
| 4 | — | 190 | 250 | 5.5:1 | 21 | 237 | — | 4.0 | — |
| 5 | — | 190 | 500 | 2.7:1 | 21 | 237 | — | 3.5 | — |
| 6 | — | 190 | 500 | 2.7:1 | 21 | 237 | 60 (nitrite) | 3.5 | — |
| 7 | — | 190 | 500 | 2.7:1 | 21 | 237 | — | 4.0 | 500 (Ce(NO$_3$)$_3$) |
| 8 | — | 190 | 500 | 2.7:1 | 21 | 237 | — | 4.0 | 500 (Al$_2$(SO$_4$)$_3$) |

*Comparative example
[1]Refers to the amount of each metal (zinc, manganese, nickel) (ppm) (calculated as elemental metal) in the \pretreatment composition, based on total weight of the pretreatment composition.
[2]Refers to the amount of zirconium (ppm) (calculated as elemental metal) in the pretreatment composition, based on total weight of the pretreatment composition.
[3]Refers to the amount of phytic acid (ppm) (calculated as phytic molecule) in the pretreatment composition, based on total weight of the pretreatment composition.
[4]Refers to the molar ratio of zirconium:phytic acid in the pretreatment composition
[5]Refers to the amount of copper (ppm) (calculated as elemental metal) in the pretreatment composition, based on total weight of the pretreatment composition.
[6]Refers to the amount of total fluoride (ppm) (calculated as elemental metal based on the amount of fluorozirconic acid and/or Chemfos AFL added to the composition).
[7]Refers to the amount of reaction accelerator (ppm) (calculated as nitrite) in the pretreatment composition, based on total weight of the pretreatment composition.
[8]Refers to the adjusted pH of the pretreatment composition, measured using a pH meter (Orion Dual Star Dual Channel Benchtop Meter, available from Thermoscientific; pH probe, Accumet pH probe available from Sigma Aldrich).
[9]Refers to the amount of cerium (Example 7) or aluminum (Example 8) (calculated as elemental metal) in the sealer composition, based on total weight of the sealer composition.

Example 1

Three cold rolled steel panels were obtained from ACT (Hillsdale Mich.) for testing. The panels were spray cleaned and degreased at 10-15 psi for two minutes at 120° F. (49° C.) in alkaline cleaner and rinsed with deionized water for thirty seconds. The alkaline cleaner was comprised of 1.25 wt % Chemkleen 2010LP (commercially available from All panels were exposed to cyclic corrosion testing (60 cycles, GMW14872 or 1500 hours neutral salt spray (NSS)). Corrosion performance data are reported in Table 3.

Example 2 (Comparative)

Three cold rolled steel panels were obtained from ACT (Hillsdale Mich.) for testing and were cleaned and degreased as described in Example 1.

The pretreatment composition was prepared by adding 10.8 g hexafluorozirconic acid, 11.6 g copper nitrate solution (2% copper w/w in deionized water), and 4 g Chemfos AFL (PPG Industries, Inc.) to 11 liters of deionized water. The pH was adjusted to 4.5 with Chemfil Buffer. The zirconium level was approximately 190 ppm (calculated), the copper was 21 ppm (calculated), total fluoride was 274 ppm (calculated) and the free fluoride was measured to be 50 ppm using a fluoride ISE. See Table 2. All panels were immersed in the pretreatment composition for 2 minutes at ambient temperature, rinsed with deionized water for 30 seconds, and dried with hot air (130° F. [54° C.]).

All panels were painted via electrodeposition as described in Example 1 and were exposed to cyclic corrosion testing (60 cycles GMW14872 or 1500 hours NSS) as described in Example 1. Corrosion performance data are reported in Table 3.

Example 3 (Comparative)

Three cold rolled steel panels were obtained from ACT (Hillsdale Mich.) for testing and were cleaned and degreased as described in Example 1.

Prior to application of zinc phosphate and after alkaline cleaning, the cleaned panels were immersed in a colloidal titanium phosphate rinse conditioner (commercially available from PPG Industries, Inc. as Rinse Conditioner) for one minute at 72° F. [22° C.]). A tricationic zinc phosphate bath containing zinc, nickel and manganese (Chemfos 700), was formulated using materials supplied by PPG Industries, Inc. according to the manufacturer's specifications. See Table 2. All panels were immersed in the bath containing the zinc phosphate pretreatment composition for 2 minutes at 125° F. [52° C.], rinsed with deionized water for 30 seconds, and dried with hot air (130° F. [54° C.]).

All panels were painted via electrodeposition as described in Example 1 and were exposed to cyclic corrosion testing (60 cycles GMW14872 or 1500 hours NSS) as described in Example 1. Corrosion performance data are reported in Table 3.

The corrosion performance test results of treating the panels in Examples 1-3 are provided in Table 3 below. As indicated, the average total scribe creep (60 cycles, GMW 14872) was improved in panels pretreated with the pretreatment composition of Example 1 compared to panels pretreated with the pretreatment composition of comparative Example 2, and was comparable to the scribe creep obtained in panels pretreated with pretreatment composition of comparative Example 3. The average total scribe creep (1500 hours, neutral salt spray) was modestly improved in panels pretreated with the pretreatment composition of Example 1 compared to panels pretreated with the pretreatment composition of comparative Example 2.

TABLE 3

Corrosion Performance of Panels in Examples 1 to 3

| Example | 60 Cycles GMW 14872 | | 1500 Hours NSS | |
|---|---|---|---|---|
| | Avg. Total Scribe Creep (mm) | Std. Deviation (mm) | Avg. Total Scribe Creep (mm) | Std. Deviation (mm) |
| 1 | 6.6 | 1.4 | 5.1 | 3.5 |
| 2(Comp.) | 9.9 | 3.5 | 5.4 | 1.8 |
| 3(Comp.) | 6.1 | 1.7 | 2.8 | 0.6 |

Example 4

Three cold rolled steel panels were obtained from ACT (Hillsdale Mich.) for testing and were cleaned and degreased as described in Example 1.

The pretreatment composition was prepared by adding 10.8 g hexafluorozirconic acid, 11.6 g copper nitrate solution (2% copper w/w in deionized water), 12.2 g phytic acid solution, and 2.8 g Chemfos AFL to 11 liters of deionized water. The pH was adjusted to 4.0 with Chemfil Buffer (an alkaline buffering solution, PPG Industries, Inc.). The zirconium level was approximately 190 ppm (calculated), the copper was 21 ppm (calculated), the phytic acid was 250 ppm (calculated), total fluoride was 237 ppm (calculated) and the free fluoride was measured to be 65 ppm using a fluoride ISE. See Table 2. All panels were immersed in the pretreatment composition for 2 minutes at ambient temperature, rinsed with deionized water for 30 seconds, and dried with hot air (130° F. [54° C.]).

All panels were painted via electrodeposition as described in Example 1 and were exposed to cyclic corrosion testing (60 cycles GMW14872 or 1500 hours NSS) as described in Example 1. Corrosion performance data are reported in Table 4.

Example 5

Three cold rolled steel panels were obtained from ACT (Hillsdale Mich.) for testing and were cleaned and degreased as described in Example 1.

The pretreatment composition was prepared by adding 10.8 g hexafluorozirconic acid, 11.6 g copper nitrate solution (2% copper w/w in deionized water), and 12.2 g phytic acid solution to 11 liters of deionized water. The pH was adjusted to 3.5 with Chemfil Buffer. The zirconium level was approximately 190 ppm (calculated), the copper was 21 ppm (calculated), the phytic acid was 500 ppm (calculated), total fluoride was 237 ppm (calculated) and the free fluoride was measured to be 65 ppm using a fluoride ISE. See Table 2. All panels were immersed in the pretreatment composition for 2 minutes at ambient temperature, rinsed with deionized water for 30 seconds, and dried with hot air (130° F. [54° C.]).

All panels were painted via electrodeposition as described in Example 1 and were exposed to cyclic corrosion testing (60 cycles GMW14872 or 1500 hours NSS) as described in Example 1. Corrosion performance data are reported in Table 4.

Example 6

Three cold rolled steel panels were obtained from ACT (Hillsdale Mich.) for testing and were cleaned and degreased as described in Example 1.

The pretreatment composition was prepared by adding 10.8 g hexafluorozirconic acid, 11.6 g copper nitrate solution (2% copper w/w in deionized water), 12.2 g phytic acid solution, and 1 g of reaction accelerator (sodium nitrite (solid), Fisher Chemical) to 11 liters of deionized water. The pH was adjusted to 3.5 with Chemfil Buffer. The zirconium level was approximately 190 ppm (calculated), the copper was 21 ppm (calculated), the phytic acid was 500 ppm (calculated), total fluoride was 237 ppm (calculated), the free fluoride was measured to be 65 ppm using a fluoride ISE, and nitrite was 60 ppm (calculated). See Table 2. All panels were immersed in the pretreatment composition for 2 minutes at ambient temperature, rinsed with deionized water for 30 seconds, and dried with hot air (130° F. [54° C.]).

All panels were painted via electrodeposition as described in Example 1 and were exposed to cyclic corrosion testing (60 cycles GMW14872 or 1500 hours NSS) as described in Example 1. Corrosion performance data are reported in Table 4.

Example 7

Three cold rolled steel panels were obtained from ACT (Hillsdale Mich.) for testing and were cleaned and degreased as described in Example 1.

The pretreatment composition was prepared by adding 10.8 g hexafluorozirconic acid (45% w/w in water), 11.6 g copper nitrate solution (2% copper w/w in deionized water) and 12.2 g phytic acid solution (40-50% w/w in water, Acros-Organics) to 11 liters of deionized water. The pH was adjusted to 4.0 with Chemfil Buffer (an alkaline buffering solution, commercially available PPG Industries, Inc.). The zirconium level was approximately 190 ppm (calculated), the copper was 21 ppm (calculated), the phytic acid was 500 ppm (calculated), total fluoride was 237 ppm (calculated), and the free fluoride was measured to be 65 ppm using a fluoride ISE. See Table 2. All panels were immersed in the pretreatment composition for 2 minutes at ambient temperature.

The sealer composition was prepared by adding 17.0 g of cerium nitrate ($Ce(NO_3)_3 \cdot 6H_2O$ from Acros Organics) to 11 liters of deionized water. The pH was adjusted to 4.0 with Chemfil Buffer. The cerium level was approximately 500 ppm. See Table 2 Immediately after immersion in the pretreatment bath (i.e., panels were not rinsed or dried), wet panels were immersed in the sealing composition at ambient temperature (22.2° C.) for 1 minute and then were dried with hot air.

All panels were painted via electrodeposition as described in Example 1 and were exposed to cyclic corrosion testing (60 cycles GMW14872 or 1500 hours NSS) as described in Example 1. Corrosion performance data are reported in Table 4.

Example 8

Three cold rolled steel panels were obtained from ACT (Hillsdale Mich.) for testing and were cleaned and degreased as described in Example 1.

The pretreatment composition was prepared by adding 10.8 g hexafluorozirconic acid (45% w/w in water), 11.6 g copper nitrate solution (2% Cu w/w in deionized water) and 12.2 g phytic acid solution (40-50% w/w in water, Acros-Organics) to 11 liters of deionized water. The pH was adjusted to 4.0 with Chemfil Buffer (an alkaline buffering solution, commercially available PPG Industries, Inc.). The zirconium level was approximately 190 ppm (calculated), the copper was 21 ppm (calculated), the phytic acid was 500 ppm (calculated), total fluoride was 237 ppm (calculated), and the free fluoride was measured to be 65 ppm using a fluoride ISE. See Table 2. All panels were immersed in the pretreatment composition for 2 minutes at ambient temperature.

The sealer composition was prepared by adding 125 g of aluminum sulfate (27.9% w/w in water) to 11 liters of deionized water. The pH was adjusted to 4.0 with Chemfil Buffer. The aluminum level was approximately 500 ppm. See Table 2 Immediately after immersion in the pretreatment bath (i.e., panels were not rinsed or dried), wet panels were immersed in the sealing composition at ambient temperature (22.2° C.) for 1 minute and then were dried with hot air.

All panels were painted via electrodeposition as described in Example 1 and were exposed to cyclic corrosion testing (60 cycles GMW14872 or 1500 hours NSS) as described in Example 1. Corrosion performance data are reported in Table 4.

The corrosion performance test results of treating the panels in Examples 4-8 are provided in Table 4 below. As indicated, the average total scribe creep (60 cycles, GMW 14872; and 1500 hrs NSS) in panels pretreated with the pretreatment composition of Example 4 compared to panels pretreated with the pretreatment composition of Example 1 (see Table 3) and was comparable to panels pretreated with the pretreatment composition of Example 3 (see Table 3). These data demonstrate that a lower amount of phytic acid in the pretreatment composition is effective at improving corrosion performance Additionally, the average total scribe creep (60 cycles, GMW 14872) of panels pretreated with the pretreatment composition of Example 5 was comparable to that of panels pretreated with comparative Example 2, but was improved somewhat by the inclusion of the reaction accelerator in the pretreatment composition (Example 6). Treatment of pretreated panels with a sealer composition may provide additional improvements to corrosion performance (Examples 7 and 8).

TABLE 4

Corrosion Performance of Panels in Examples 4 to 8

| | 60 Cycles GMW 14872 | | 1500 Hours NSS | |
| --- | --- | --- | --- | --- |
| Example | Avg. Total Scribe Creep (mm) | Avg. Max Scribe Creep (mm) | Avg. Total Scribe Creep (mm) | Avg. Max Scribe Creep (mm) |
| 4 | 6 | 7.9 | 4.3 | 6.2 |
| 5 | 8.8 | 11.3 | 4.8 | 7.5 |
| 6 | 8.2 | 12.8 | 3.4 | 5.2 |
| 7 | 7.9 | 11.6 | 4.5 | 6.2 |
| 8 | 6.2 | 9.1 | 4.9 | 9.6 |

Examples 9-11

In order to determine the effect of a spray-applied pretreatment composition containing zirconium and phytic acid on corrosion performance, panels in Examples 9-11 were treated with pretreatment compositions containing zirconium, phytic acid, and copper. The pH of the pretreatment composition was varied in each Example.

A summary of the pretreatment compositions and treatment protocols for panels used in Examples 9 to 11 is provided in Table 5. Details of the protocol followed for each Example are provided below.

TABLE 5

Pretreatment Compositions and Treatment Protocols for Examples 9 to 11

| EXAMPLE | Zr[1] (ppm) | PA[2] (ppm) | Zr:PA (molar ratio)[3] | Cu[4] (ppm) | Total Fluroide[5] (ppm) | pH[6] |
| --- | --- | --- | --- | --- | --- | --- |
| 9 | 90 | 150 | 4.3:1 | 10 | 113 | 2.7 |
| 10 | 90 | 150 | 4.3:1 | 10 | 113 | 3.2 |
| 11 | 90 | 150 | 4.3:1 | 10 | 113 | 4.2 |

[1]Refers to the amount of zirconium (ppm) (calculated as elemental metal) in the pretreatment composition, based on total weight of the pretreatment composition.
[2]Refers to the amount of phytic acid (ppm) (calculated as phytic molecule) in the pretreatment composition, based on total weight of the pretreatment composition.
[3]Refers to the molar ratio of zirconium to phytic acid in the pretreatment composition.
[4]Refers to the amount of copper (ppm) (calculated as elemental metal) in the pretreatment composition, based on total weight of the pretreatment composition.
[5]Refers to the amount of total fluoride (ppm) (calculated as elemental metal based on the amount of fluorozirconic acid or Chemfos AFL added to the composition).
[6]Refers to the adjusted pH of the pretreatment composition, measured using a pH meter (Orion Dual Star Dual Channel Benchtop Meter, available from Thermoscientific; pH probe, Accumet pH probe available from Sigma Aldrich).

Example 9

Three cold rolled steel panels were obtained from ACT (Hillsdale Mich.) for testing and were cleaned and degreased as in Example 1.

The pretreatment composition was prepared by adding 21.8 g hexafluorozirconic acid, 2.73 g copper nitrate solution (18% Cu w/w in deionized water, commercially available from PPG Industries), and 16.4 g phytic acid solution to 49.1 liters of deionized water. The zirconium level was approximately 90 ppm (calculated), the copper was 10 ppm (calculated), the phytic acid was 150 ppm (calculated), pH was 2.7, and the total fluoride was 113 ppm (calculated). The free fluoride was measured to be 15 ppm using a fluoride ISE. See Table 5. All panels were sprayed with the pretreatment composition for 1 minute at 15 psi and ambient temperature, rinsed with deionized water for 30 seconds, and dried with hot air (130° F. [54° C.]).

All panels were painted via electrodeposition as described in Example 1 and were exposed to cyclic corrosion testing (60 cycles GMW14872 or 1500 hours NSS) as described in Example 1. Corrosion performance data are reported in Table 6.

Example 10

Three cold rolled steel panels were obtained from ACT (Hillsdale Mich.) for testing and were cleaned and degreased as in Example 1.

The pretreatment composition was prepared by adding 21.8 g hexafluorozirconic acid, 2.73 g copper nitrate solution (18% Cu w/w in deionized water, commercially available from PPG Industries), and 16.4 g phytic acid solution to 13 gal of deionized water. The pH was adjusted to pH 3.2 with Chemfil Buffer. The zirconium level was approximately 90 ppm (calculated), the copper was 10 ppm (calculated), the phytic acid was 150 ppm (calculated), and the total fluoride was 113 ppm (calculated). The free fluoride was measured to be 25 ppm using a fluoride ISE. See Table 5. All panels were sprayed with the pretreatment composition for 1 minute at 15 psi and ambient temperature, rinsed with deionized water for 30 seconds, and dried with hot air (130° F. [54° C.]).

All panels were painted via electrodeposition as described in Example 1 and were exposed to cyclic corrosion testing (60 cycles GMW14872 or 1500 hours NSS) as described in Example 1. Corrosion performance data are reported in Table 6.

Example 11

Three cold rolled steel panels were obtained from ACT (Hillsdale Mich.) for testing and were cleaned and degreased as in Example 1.

The pretreatment composition was prepared by adding 21.8 g hexafluorozirconic acid, 2.73 g copper nitrate solution (18% Cu w/w in deionized water, commercially available from PPG Industries), and 16.4 g phytic acid solution to 13 gal of deionized water. The pH was adjusted to pH 4.2 with Chemfil Buffer. The zirconium level was approximately 90 ppm (calculated), the copper was 10 ppm (calculated), the phytic acid was 150 ppm (calculated), and the total fluoride was 113 ppm (calculated). The free fluoride was measured to be 40 ppm using a fluoride ISE. See Table 5. All panels were sprayed with the pretreatment composition for 1 minute at 15 psi and ambient temperature, rinsed with deionized water for 30 seconds, and dried with hot air (130° F. [54° C.]).

All panels were painted via electrodeposition as described in Example 1 and were exposed to cyclic corrosion testing (60 cycles GMW14872 or 1500 hours NSS) as described in Example 1. Corrosion performance data are reported in Table 6.

The corrosion performance test results of treating the panels in Examples 9-11 are provided in Table 6 below. As indicated, the average total scribe creep (60 cycles, GMW 14872) was improved in panels pretreated with the pretreatment composition of Examples 9 and 10 compared to panels pretreated with the pretreatment composition of Example 11, demonstrating the positive effect that pretreatment compositions having lower pH has on corrosion performance in spray applications.

TABLE 6

Corrosion Performance of Panels in Examples 9 to 11

| | 60 Cycles GMW 14872 | | 1500 Hours NSS | |
| --- | --- | --- | --- | --- |
| Example | Avg. Total Scribe Creep (mm) | Avg. Max Scribe Creep (mm) | Avg. Total Scribe Creep (mm) | Avg. Max Scribe Creep (mm) |
| 9 | 7 | 10.1 | 4.2 | 4.8 |
| 10 | 5 | 9.1 | 4.9 | 7.9 |
| 11 | 12.7 | 19.8 | 43.7 | 49 |

Examples 12-13

In order to determine the effect of a pretreatment composition containing zirconium and phytic acid on corrosion performance, panels in Examples 12-13 were treated with pretreatment compositions containing zirconium and phytic acid, and corrosion performance was compared to panels pretreated with either zirconium alone. In Examples 12-13, the pretreatment composition was applied by spraying the panels with the pretreatment composition, as described in more detail below. The pretreatment compositions in Examples 12 and 13 did not include copper.

Example 12

Two panels of batch annealed cold rolled steel, produced by USS Processed Products, were placed on a conveyor and were spray cleaned using an alkaline cleaner (Ultrax 97, commercially available from PPG Industries, Inc. (4% v/v at 140° F. (60° C.))) for 40 seconds at 13.5 psi.

After rinsing with city water, the panels were spray rinsed with a pre-rinse composition containing ammonium bifluoride (250-275 ppm total F) (Acid Metal Cleaner Zr, commercially available from PPG Industries, Inc. (AMCZR 5% v/v at 80° F. (26.7° C.))) for 25 seconds at 6.5 psi.

The pretreatment composition was prepared by adding 24 grams of hexafluorozirconic acid (45% w/w in water) and 17 grams of phytic acid solution (50% w/w in water, Aldrich Chemical) to 15 gallons of deionized water. This produced approximately 80 ppm zirconium and 150 ppm phytic acid (neat) in the processing bath which was then adjusted to pH 4.9 using PPG Chemfil Buffer.

The pretreatment composition (80° F. (26.7° C.) bath temperature) was spray applied to the panels for 60 seconds at 11.5 psi. The panels were rinsed again using city water followed by a deionized water rinse (10 second spray). The panels then were passed through a bank of infrared heaters (Glo-Quartz Model RP 12-13, Electric-Heater Co. Inc.) to thoroughly dry the coated panels before painting.

The pretreated panels were painted with an epoxy-polyester hybrid powder coating and were cured at 350° F. (176.7° C.) for 15 minutes for a film thickness between 2-4 mils (51-76 microns).

The panels then were scribed in an "X" pattern and allowed to soak in a 165° F. (73.9° C.) detergent solution for a corrosion test per ASTM D2248-01a (Standard Practice for Detergent Resistance of Organic Finishes). After 100 hours, the panels were retrieved from the detergent solution, rinsed, air dried and allowed to stand for twenty-four hours. Tape was applied on the scribes and then was pulled to remove loosely adhering paint that resulted from undercut corrosion. Corrosion performance data are reported in Table 7.

Example 13

Two panels of batch annealed cold rolled steel, produced by USS Processed Products, were placed on a conveyor and were spray cleaned using an alkaline cleaner as described in Example 12.

After rinsing with city water, the panels were spray rinsed with the pre-rinse composition as described in Example 12.

The pretreatment composition was prepared by adding 2.8 liters of a zirconium-containing composition (XBond 4000SM/SR, PPG Industries) to deionized water for a total of 56.8 liters bath volume (5% v/v). This produced approximately 150 ppm to 160 ppm zirconium in the processing bath, which was then adjusted to pH 4.75 using PPG Chemfil Buffer.

The pretreatment composition (80° F. bath temperature) was spray applied to the panels for 60 seconds at 11.5 psi. Panels were rinsed with city water and deionized water, dried, and powder coated as described in Example 12. Panels then were tested for corrosion performance as described in Example 12. Corrosion performance data are reported in Table 7.

TABLE 7

Corrosion Performance of Panels in Examples 12 and 13

| Example | Total F[1] (ppm) | Zr[2] (ppm) | PA[3] (ppm) | Zr:PA (molar ratio)[4] | P1[5] (mm) | P2[6] (mm) | CRS Avg.[7] (mm) |
|---|---|---|---|---|---|---|---|
| 12 | 250-275 | 80 | 150 | 3.9:1 | 5.8 | 4.4 | 5.1 |
| 13 | 250-275 | 150-160 | — | — | 10.8 | 9.0 | 9.9 |

[1]Refers to the amount of total fluoride (ppm) (calculated based on the amount of Acid Metal Conditioner Zr added to the composition).
[2]Refers to the amount of zirconium (ppm) (calculated as elemental metal) in the pretreatment composition, based on total weight of the pretreatment composition.
[3]Refers to the amount of phytic acid (ppm) (calculated as phytic molecule) in the pretreatment composition, based on total weight of the pretreatment composition.
[4]Refers to the molar ratio of zirconium:phytic acid in the pretreatment composition
[5]Refers to the scribe creep (mm) for panel 1 treated in each Example.
[6]Refers to the scribe creep (mm) for panel 2 treated in each Example.
[7]Refers to the average of the scribe creeps P1 and P2.

As reported in Table 7, the inclusion of phytic acid in the pretreatment composition resulted in an improved corrosion performance (5.1 mm average scribe creep) compared to panels pretreated with a zirconium-only pretreatment composition (9.9 mm average scribe creep).

Example 14

In order to further evaluate the effect of a pretreatment composition containing zirconium and phytic acid on corrosion performance, panels in Example 14 were treated with pretreatment compositions containing a range of concentrations of zirconium and phytic acid, and corrosion performance was compared to panels pretreated with either zirconium alone or zinc phosphate. In Example 14, the pretreatment composition was applied by spraying the with the pretreatment composition, as described in more detail below. The effect of temperature and pH of the pretreatment composition and of spray pressure on corrosion performance also were evaluated in Example 14. The pretreatment compositions in Example 14 did not include copper.

For all of the runs (14-1 to 14-13), three batch annealed cold rolled steel panels were obtained from USS Processed Products and were cleaned as described in Example 12.

After rinsing with city water, the panels were spray rinsed a second time with city water for 25 seconds at 6.5 psi. No fluoride pre-rinse was used.

For each of runs 14-1 to 14-13, the pretreatment composition was prepared by adding the required grams of hexafluorozirconic acid (45% w/w in water) and required grams of phytic acid solution (50% w/w in water, Aldrich Chemical) to 15 gallons (56.9 liters) of deionized water as listed in Table 8. The target concentrations of zirconium and phytic acid, along with the required weights of the raw materials are listed in Table 8. After mixing the ingredients, but prior to spraying on panels, the pH of each bath was adjusted with Chemfil Buffer to the desired level for the run as indicated in Table 8.

For each run, and as shown in Table 8, the pretreatment composition, after heating to the desired bath temperature, was spray applied to the panels for 60 seconds at the pressure indicated in Table 8. Panels were rinsed with city water and deionized water, dried, and powder coated as described in Example 12. Panels then were tested for corrosion performance as described in Example 12. Corrosion performance data are reported in Table 8.

TABLE 8

Analysis of Pretreatment Composition and Composition Parameters on Corrosion Performance (Example 14)

| | | | | | | Wts. for 15 gal. | | whole-width scribe loss | | | |
|---|---|---|---|---|---|---|---|---|---|---|---|
| Example[1] | Zr[2] (ppm) | PA[3] (ppm) | pH[4] | Temp[5] (F) | Spray[6] (psi) | FZA[7] (gms) | Phytic acid[8] (gms) | P1[9] (mm) | P2[10] (mm) | P3[11] (mm) | CRS Avg.[12] (mm) |
| 14-1 | 200 | 0 | 4.3 | 75 | 15 | 56.8 | 0.0 | 12.0 | 13.8 | 15.0 | 13.6 |
| 14-2 | 50 | 0 | 5 | 88 | 15 | 14.2 | 0.0 | 8.0 | 7.5 | 8.9 | 8.1 |
| 14-3 | 50 | 250 | 5 | 75 | 11 | 14.2 | 28.3 | 11.0 | 11.9 | 12.5 | 11.8 |
| 14-4 | 50 | 500 | 4.3 | 100 | 11 | 14.2 | 56.7 | 20.1 | 24.5 | 20.8 | 21.8 |
| 14-5 | 50 | 500 | 3.8 | 75 | 15 | 14.2 | 56.7 | 16.5 | 17.1 | 17.8 | 17.1 |
| 14-6 | 125 | 0 | 3.8 | 75 | 11 | 35.5 | 0.0 | 9.3 | 9.3 | 10.1 | 9.5 |
| 14-7 | 125 | 500 | 5 | 100 | 15 | 35.5 | 56.7 | 13.5 | 12.8 | 12.5 | 12.9 |
| 14-8 | 50 | 0 | 3.8 | 100 | 13 | 14.2 | 0.0 | 9.3 | 6.9 | 10.6 | 8.9 |

TABLE 8-continued

Analysis of Pretreatment Composition and Composition Parameters on Corrosion Performance (Example 14)

|  |  |  |  |  |  | Wts. for 15 gal. | | whole-width scribe loss | | | |
|---|---|---|---|---|---|---|---|---|---|---|---|
| Example[1] | Zr[2] (ppm) | PA[3] (ppm) | pH[4] | Temp[5] (F) | Spray[6] (psi) | FZA[7] (gms) | Phytic acid[8] (gms) | P1 $(mm)^9$ | P2 $(mm)^{10}$ | P3 $(mm)^{11}$ | CRS Avg. $(mm)^{12}$ |
| 14-9 | 200 | 500 | 5 | 75 | 13 | 56.8 | 56.7 | 9.0 | 12.0 | 9.8 | 10.3 |
| 14-10 | 200 | 500 | 3.8 | 88 | 11 | 56.8 | 56.7 | 9.5 | 9.5 | 11.3 | 10.1 |
| 14-11 | 125 | 250 | 4.3 | 88 | 13 | 35.5 | 28.3 | 7.5 | 5.8 | 5.8 | 6.3 |
| 14-12 | 200 | 250 | 3.8 | 100 | 15 | 56.8 | 28.3 | 4.3 | 4.3 | 5.0 | 4.5 |
| 14-13 | 200 | 0 | 5 | 100 | 11 | 56.8 | 0.0 | 5.0 | 7.3 | 9.5 | 7.3 |

[1] In each Example 14-1 to 14-13, the pretreatment composition was prepared by adding the indicated grams of hexafluorozirconic acid (45% FZA w/w) and phytic acid solution (50% w/w) to 15 gallons (56.9 liters) of deionized water. pH of the pretreatment composition was adjusted to the pH shown in this table using PPG Chemfil Buffer.
[2] Refers to the amount of zirconium (ppm) (calculated as elemental metal) in the pretreatment composition, based on total weight of the pretreatment composition.
[3] Refers to the amount of phytic acid (ppm) (calculated as phytic molecule) in the pretreatment composition, based on total weight of the pretreatment composition.
[4] Refers to the adjusted pH of the pretreatment composition.
[5] Refers to the temperature of the pretreatment composition at the time of application to the substrate.
[6] Refers to the spray pressure (psi) used to spray apply the pretreatment composition to the substrate.
[7] Refers to the amount (grams) of hexafluorozirconic acid (45% FZA w/w) added to 15 gallons (56.9 liters) of deionized water to make the pretreatment solution.
[8] Refers to the amount (grams) of phytic acid solution (50% w/w) added to 15 gallons (56.9 liters) of deionized water to make the pretreatment solution.
[9] Refers to the scribe creep (mm) for panel 1 treated in each Example.
[10] Refers to the scribe creep (mm) for panel 2 treated in each Example.
[11] Refers to the scribe creep (mm) for panel 3 treated in each Example.
[12] Refers to the average of the scribe creeps P1, P2, and P3.

Statistical analysis showed that the concentrations of zirconium and phytic acid, and their interactions with each other, were significant effects on scribe creep at greater than 98% confidence. Also significant to the same degree was a phytic acid quadratic or curvature effect. Statistical analysis showed that bath pH, temperature and spray pressure (psi) were insignificant effects on scribe creep.

The molar ratio of zirconium:phytic acid in the pretreatment composition was calculated for Runs 14-3, 14-4, 14-5, 14-7, 14-9, 14-10, 14-11 and 14-12. Included is a checkpoint run with 80 ppm Zr and 150 ppm phytic acid (4.8 pH, 80.5 F, 11.5 psi for 60 seconds). As shown in Table 9, there was improved corrosion performance in panels treated with the zirconium/phytic acid containing pretreatment as the ratio between zirconium and phytic acid increased. A molar ratio of 5.8:1 (zirconium:phytic acid) provided the best performance, with an average scribe creep of 4.5 mm. These data also are plotted in FIG. 1.

TABLE 9

Molar Ratios and Corrosion Performance (Example 14)

| Example | Zr[1] (ppm) | PA[2] (ppm) | CRS Avg. $(mm)^3$ | Zr:PA (molar ratio)[4] |
|---|---|---|---|---|
| 14-12 | 200 | 250 | 4.5 | 5.8 |
| checkpoint | 80 | 150 | 5.2 | 3.9 |
| 14-11 | 125 | 250 | 6.3 | 3.6 |
| 14-13 | 200 | 0 | 7.3 | — |
| 14-2 | 50 | 0 | 8.1 | — |
| 14-8 | 50 | 0 | 8.9 | — |
| 14-6 | 125 | 0 | 9.5 | — |
| 14-10 | 200 | 500 | 10.1 | 2.9 |
| 14-9 | 200 | 500 | 10.3 | 2.9 |
| 14-3 | 50 | 250 | 11.8 | 1.4 |
| 14-7 | 125 | 500 | 12.9 | 1.8 |
| 14-1 | 200 | 0 | 13.6 | — |
| 14-5 | 50 | 500 | 17.1 | 0.7 |
| 14-4 | 50 | 500 | 21.8 | 0.7 |

[1] Refers to the amount of zirconium (ppm) (calculated as elemental metal) in the pretreatment composition, based on total weight of the pretreatment composition.
[2] Refers to the amount of phytic acid (ppm) (calculated as phytic molecule) in the pretreatment composition, based on total weight of the pretreatment composition.
[3] Refers to the average of the scribe creeps P1, P2, and P3.
[4] Refers to the molar ratio of zirconium:phytic acid in the pretreatment composition.

Examples 15-22

In Examples 15-22, in order to further evaluate the effect of a pretreatment composition containing zirconium and phytic acid on corrosion performance, and to evaluate the effect of treating panels with a pre-rinse conditioner and/or a sealer composition, panels were treated with pretreatment compositions containing zirconium and phytic acid, and corrosion performance was compared to panels pretreated with either zirconium alone or zinc phosphate. Pretreatment compositions were applied by spraying the with the pretreatment composition, as described in more detail below. The pretreatment compositions in Examples 15-22 did not include copper.

Example 15

Three batch annealed cold rolled steel panels were obtained from USS Processed Products and were spray cleaned as described in Example 12.

After rinsing with city water, the panels were spray rinsed with the pre-rinse composition as described in Example 12.

The pretreatment composition was prepared by adding 90.8 g grams of hexafluorozirconic acid (45% w/w in water)

and 36.4 grams of phytic acid solution (50% w/w in water, Aldrich Chemical) to 15 gallons (56.8 liters) of deionized water. This produced approximately 300 ppm zirconium and 300 ppm phytic acid (neat) in the processing bath which was then adjusted to pH 4.75 using PPG Chemfil Buffer.

The pretreatment composition (95 F bath temperature) was spray applied to the panels for 60 seconds at 11.5 psi. Panels were rinsed with city water.

The panels then were sprayed with a sealer composition containing 2.8 liters of a zirconium-containing composition (XBond 4000SM/SR (PPG Industries)) to deionized water for a total of 56.8 liters bath volume (5% v/v).

(0.5% v/v at 112° F.) for approximately 30 seconds at 7 psi. The sealer was dried in place (i.e., the panels were not rinsed). The panels then were passed through the bank of infrared heaters as described in Example 12 to thoroughly dry the coated panels before painting. Panels were powder-coated and tested for corrosion performance as described in Example 12. Corrosion performance data are reported in Table 10.

Example 16

Three batch annealed cold rolled steel panels were obtained from USS Processed Products and were spray cleaned as described in Example 12.

After rinsing with city water, the panels were rinsed a second time with city water for 25 seconds at 6.5 psi.

The pretreatment composition was prepared by adding 2.8 liters XBond 4000SM/SR (PPG Industries) to deionized water for a total of 56.8 liters bath volume (5% v/v). This produced approximately 150 ppm to 160 ppm zirconium in the processing bath, which was then adjusted to pH 4.75 using PPG Chemfil Buffer.

The pretreatment composition (93° F. bath temperature) was spray applied to the panels for 60 seconds at 11.5 psi.

The panels were rinsed again using city water followed by a deionized water rinse (10 second spray). The panels then were passed through the bank of infrared heaters as described in Example 12 to thoroughly dry the coated panels before painting. Panels were powder-coated and tested for corrosion performance as described in Example 12. Corrosion performance data are reported in Table 10.

Example 17 (Comparative)

Three batch annealed cold rolled steel panels were obtained from USS Processed Products and were cleaned as described in Example 12.

After rinsing with city water, the panels were spray rinsed with the pre-rinse composition as described in Example 12.

The pretreatment composition was prepared by adding 2.8 liters XBond 4000SM/SR (PPG Industries) to deionized water for a total of 56.8 liters bath volume (5% v/v). This produced approximately 150 ppm to 160 ppm zirconium in the processing bath, which was then adjusted to pH 4.75 using PPG Chemfil Buffer.

The pretreatment composition (91° F. bath temperature) was spray applied to the panels for 60 seconds at 11.5 psi. The panels were rinsed with city water.

The panels then were sprayed with a sealer composition made up of 300 mls. of SBond 10 in 15 gallons of deionized water (PPG SBS10, 0.5% v/v at 112° F., pH 4.5) for approximately 20 seconds at 12 psi. After the sealed panels were rinsed with deionized water, they then were passed through the bank of infrared heaters as described in Example 12 to thoroughly dry before painting. Panels were powder-coated and tested for corrosion performance as described in Example 12. Corrosion performance data are reported in Table 10.

Example 18

Three batch annealed cold rolled steel panels (obtained from USS Processed Products) were placed on a conveyor and were spray cleaned as described in Example 12.

After rinsing with city water, the panels were spray rinsed with a tricationic rinse conditioner (Rinse Conditioner commercially available from PPG Industries, Inc., 70 g/15 gallons at 80° F.) for 20 seconds at 7 psi.

The pretreatment composition was prepared by adding 1.7 liters of a zinc-manganese phosphate pretreatment (PPG ZetaPhos 811S, 3% v/v), adjusted to a free acid of 1.0 with Chemfil Buffer. This produced approximately 1500 ppm of zinc and 600 ppm manganese.

The pretreatment composition (125 F bath temperature) was spray applied to the panels for 60 seconds at 11 psi. Panels then were rinsed with city water.

The panels then were sprayed with a sealer composition (PPG ChemSeal 59, 1% v/v at 90° F., 10,000 ppm of concentrate, pH 3.4) for approximately 20 seconds at 12 psi. Panels then were rinsed with deionized water, and then were passed through the bank of infrared heaters as described in Example 12 to thoroughly dry before painting. Panels were powder-coated and tested for corrosion performance as described in Example 12. Corrosion performance data are reported in Table 10.

TABLE 10

Corrosion Performance of Panels in Examples 15 to 18

| Example | Pre-rinse, total F[1] (ppm) | Metal[2] (ppm) | Zr[3] (ppm) | PA[4] (ppm) | Sealer[5] (ppm) | DI rinse[6] | Scribe loss, mm whole-width | | | |
|---|---|---|---|---|---|---|---|---|---|---|
| | | | | | | | P1[7] (mm) | P2[8] (mm) | P3[9] (mm) | CRS Avg.[10] (mm) |
| 15 | 250 to 275 | — | 300 | 300 | 5000 | — | 0.4 | 0.5 | 0.5 | 0.5 |
| 16 | — | — | 150 to 160 | 0 | — | — | 6.8 | 10.0 | 6.3 | 7.7 |
| 17 | 250 to 275 | — | 150 to 160 | 0 | 5000 | — | 4.5 | 4.0 | 3.0 | 3.8 |

TABLE 10-continued

Corrosion Performance of Panels in Examples 15 to 18

| Example | Pre-rinse, total F[1] (ppm) | Metal[2] (ppm) | Zr[3] (ppm) | PA[4] (ppm) | Sealer[5] (ppm) | DI rinse[6] | P1[7] (mm) | P2[8] (mm) | P3[9] (mm) | CRS Avg.[10] (mm) |
|---|---|---|---|---|---|---|---|---|---|---|
| 18 | 550 | 1500 ppm zinc, 600 ppm Manganese | — | — | 10,000 | Yes | 2.5 | 2.3 | 4.0 | 2.9 |

[1]Refers to the amount of total fluoride (ppm) (calculated based on the amount of Acid Metal Conditioner Zr added to the composition).
[2]Refers to the amount of metal (ppm) (calculated as elemental metal) in the pretreatment composition, based on total weight of the pretreatment composition.
[3]Refers to the amount of zirconium (ppm) (calculated as elemental metal) in the pretreatment composition, based on total weight of the pretreatment composition.
[4]Refers to the amount of phytic acid (ppm) (calculated as phytic molecule) in the pretreatment composition, based on total weight of the pretreatment composition.
[5]Refers to the amount (ppm) of concentrate in the sealer composition bath, based on total weight of the sealer composition.
[6]Refers to whether the panels were rinsed with deionized water following spray application of the sealer composition (Examples 15, 17, and 18).
[7]Refers to the scribe creep (mm) for panel 1 treated in each Example.
[8]Refers to the scribe creep (mm) for panel 2 treated in each Example.
[9]Refers to the scribe creep (mm) for panel 3 treated in each Example.
[10]Refers to the average of the scribe creeps P1, P2, and P3.

As indicated in Table 10, application of a pretreatment composition containing zirconium and phytic acid and application of a sealer composition following application of the pretreatment composition resulted in corrosion performance that exceeded that seen in panels pretreated with a zinc phosphate containing pretreatment composition.

Example 19

Three batch annealed cold rolled steel panels (obtained from USS Processed Products) were placed on a conveyor and were spray cleaned as described in Example 12.

After rinsing with city water, the panels were spray rinsed with the pre-rinse composition described in Example 12.

The pretreatment composition was prepared by adding 2.8 liters of a zirconium-containing pretreatment composition (XBond 4000SM/SR, commercially available from PPG Industries, Inc.) to deionized water for a total of 56.8 liters bath volume (5% v/v). This produced approximately 150 ppm to 160 ppm zirconium (calculated) in the processing bath, which was then adjusted to pH 4.75 using PPG Chemfil Buffer.

The pretreatment composition (91-93° F. bath temperature) was spray applied to the panels for 60 seconds at 11.5 psi. The panels then were rinsed with city water The panels then were sprayed with the sealer composition described in Example 17. The sealed panels were rinsed with deionized water and then were passed through the bank of infrared heaters as described in Example 12 to thoroughly dry before painting. Panels were powder-coated and tested for corrosion performance as described in Example 12. Corrosion performance data are reported in Table 11.

Example 20 (Comparative)

Three batch annealed cold rolled steel panels (obtained from USS Processed Products) were placed on a conveyor and were spray cleaned as described in Example 12.

After rinsing with city water, the panels were spray rinsed with the pre-rinse composition described in Example 12.

The pretreatment composition was prepared by adding 5.6 liters XBond 4000SM/SR (PPG Industries) to deionized water for a total of 56.8 liters bath volume (10% v/v). This produced approximately 300 ppm zirconium (calculated) in the processing bath, which was then adjusted to pH 4.75 using PPG Chemfil Buffer.

The pretreatment composition (91-93° F. bath temperature) was spray applied to the panels for 60 seconds at 11.5 psi. The panels were rinsed again using city water The panels then were sprayed with the sealer composition described in Example 17. The sealed panels were rinsed with deionized water and then were passed through the bank of infrared heaters as described in Example 12 to thoroughly dry before painting. Panels were powder-coated and tested for corrosion performance as described in Example 12. Corrosion performance data are reported in Table 11.

Example 21

Three batch annealed cold rolled steel panels (obtained from USS Processed Products) were placed on a conveyor and were spray cleaned as described in Example 12.

After rinsing with city water, the panels were spray rinsed with the pre-rinse composition described in Example 12.

The pretreatment composition was prepared by adding 90.8 g grams of hexafluorozirconic acid (45% w/w in water) and 36.4 grams of phytic acid solution (50% w/w in water, Aldrich Chemical) to 15 gallons (56.8 liters) of deionized water. This produced approximately 300 ppm zirconium (calculated) and 300 ppm phytic acid (neat) (calculated) in the processing bath which was then adjusted to pH 4.75 using PPG Chemfil Buffer.

The pretreatment compositions (91-93° F. bath temperature) were spray applied to the panels for 60 seconds at 11.5 psi. The panels then were rinsed with city water.

The panels then were sprayed with the sealer composition described in Example 17. The sealed panels were rinsed with deionized water and then were passed through the bank of infrared heaters as described in Example 12 to thoroughly dry before painting. Panels were powder-coated and tested for corrosion performance as described in Example 12. Corrosion performance data are reported in Table 11.

Example 22 (Comparative)

Three batch annealed cold rolled steel panels (obtained from USS Processed Products) were placed on a conveyor and were spray cleaned as described in Example 12.

After rinsing with city water, the panels were spray rinsed with PPG Rinse Conditioner GL (PPG RCGL, 70 g/15 gallons at 80° F.) for 20 seconds at 7 psi.

The pretreatment composition was prepared by adding 1.7 liters of a zinc-manganese phosphate pretreatment (PPG ZetaPhos 811S, 3% v/v), adjusted to a free acid of 1.0 with Chemfil Buffer. This produced approximately 1500 ppm of zinc and 600 ppm manganese (calculated).

The pretreatment composition (125 F bath temperature) was spray applied to the panels for 60 seconds at 11 psi. Panels then were rinsed with city water.

The panels then were sprayed with the sealer composition described in Example 17. The sealed panels were rinsed with deionized water and then were passed through the bank of infrared heaters as described in Example 12 to thoroughly dry before painting. Panels were powder-coated and tested for corrosion performance as described in Example 12. Corrosion performance data are reported in Table 11.

TABLE 11

Corrosion Performance of Panels in Examples 19 to 22

| Run | Pre-rinse, total $F^1$ (ppm) | Metal$^2$ (ppm) | $Zr^3$ (ppm) | $PA^4$ (ppm) | Seal$^5$ (ppm) | DI rinse$^6$ | $P1^7$ (mm) | $P2^8$ (mm) | $P3^9$ (mm) | CRS Avg.$^{10}$ (mm) |
|---|---|---|---|---|---|---|---|---|---|---|
| 19 | 250 to 275 | — | 150 | — | 5000 | no | 8 | 7 | 8 | 7.7 |
| 20 | 250 to 275 | — | 300 | — | 5000 | no | 13 | 11 | 9.5 | 11.2 |
| 21 | 250 to 275 | — | 300 | 300 | 5000 | no | 0.1 | 0 | 0.1 | 0.1 |
| 22 | 550 | 1500 ppm Zinc, 600 ppm Manganese | — | — | 10000 | yes | 2 | 4 | | 3.0 |

$^1$Refers to the amount of total fluoride (ppm) (calculated based on the amount of Acid Metal Conditioner Zr added to the composition).
$^2$Refers to the amount of metal (ppm) (calculated as elemental metal) in the pretreatment composition, based on total weight of the pretreatment composition.
$^3$Refers to the amount of zirconium (ppm) (calculated as elemental metal) in the pretreatment composition, based on total weight of the pretreatment composition.
$^4$Refers to the amount of phytic acid (ppm) (calculated as phytic molecule) in the pretreatment composition, based on total weight of the pretreatment composition.
$^5$Refers to the amount (ppm) of concentrate in the sealer composition bath, based on total weight of the sealer composition.
$^6$Refers to whether the panels were rinsed with deionized water following spray application of the sealer composition (Examples 15, 17, and 18).
$^7$Refers to the scribe creep (mm) for panel 1 treated in each Example.
$^8$Refers to the scribe creep (mm) for panel 2 treated in each Example.
$^9$Refers to the scribe creep (mm) for panel 3 treated in each Example.
$^{10}$Refers to the average of the scribe creeps P1, P2, and P3.

As indicated in Table 11, application of a pretreatment composition containing zirconium and phytic acid and application of a sealer composition following application of the pretreatment composition resulted in corrosion performance that exceeded that seen in panels pretreated with a zinc phosphate containing pretreatment composition.

We claim:

1. A pretreatment composition for treating a metal substrate, comprising:
   (a) a Group IIIB metal and/or a Group IVB metal present in a total amount of 20 ppm to 1000 ppm (calculated as elemental metal) based on the total weight of the pretreatment composition;
   (b) a compound containing at least six phosphorus-containing acid groups or salts thereof present in an amount of $1.82 \times 10^{-4}$ moles per liter to $2.73 \times 10^{-2}$ moles per liter of pretreatment composition; and
   (c) an electropositive metal;
   wherein the molar ratio of (a) to (b) is at least 3:1;
   wherein the pretreatment composition is capable of reacting with and chemically altering the substrate surface and binding to it to form a film that affords corrosion protection.

2. The pretreatment composition of claim 1, wherein the Group IIIB and/or IVB metal comprise(s) zirconium, titanium, hafnium, yttrium, scandium, or a mixture thereof.

3. The pretreatment composition of claim 1, wherein the compound containing at least six phosphorus-containing acid groups or salts thereof comprises phytic acid or salts thereof.

4. The pretreatment composition of claim 1, wherein the electropositive metal is present in an amount of 2 ppm to 100 ppm based on the total weight of the pretreatment composition.

5. The pretreatment composition of claim 1, further comprising a fluoride source present in an amount of 25 ppm to 500 ppm (calculated as total fluoride) based on the total weight of the pretreatment composition.

6. The pretreatment composition of claim 1, further comprising an oxidizing agent present in an amount of 15 ppm to 300 ppm based on the total weight of the pretreatment composition.

7. The pretreatment composition of claim 1, further comprising a fluoride source, an oxidizing agent comprising a metal source, or combinations thereof, wherein the molar ratio of Group TIM, Group IVB, and electropositive metals to the compound containing the at least six phosphorus-containing acid groups or salts thereof is greater than 1:1.

8. A pretreatment composition comprising:
   (a) a Group IIIB and/or Group IVB metal;
   (b) a compound containing at least six phosphorus-containing acid groups or salts thereof; and
   (c) an electropositive metal;
   wherein the molar ratio of (a) to (b) is at least 3:1;
   wherein the pretreatment composition is substantially free of silicon;
   wherein the pretreatment composition is substantially free of Group VB metals; and
   wherein the pretreatment composition is capable of reacting with and chemically altering the substrate surface and binding to it to form a film that affords corrosion protection.

9. The pretreatment composition of claim 8, wherein the Group IIIB and/or Group IVB metal comprises zirconium, titanium, hafnium, yttrium, scandium, or a mixture thereof.

10. The pretreatment composition of claim 8, wherein the compound containing at least six phosphorus-containing acid groups or salts thereof comprises phytic acid or salts thereof.

11. The pretreatment composition of claim 8, further comprising a fluoride source, an oxidizing agent, or combinations thereof.

12. A method for treating a metal substrate comprising:
contacting at least a portion of a surface of the substrate with a pretreatment composition comprising:
(a) a Group IIIB metal and/or a Group IVB metal in a total amount of 20 ppm to 1000 ppm (calculated as elemental metal) based on the total weight of the pretreatment composition;
(b) a compound containing at least six phosphorus-containing acid groups or salts thereof in an amount of $1.82 \times 10^{-4}$ moles per liter to $2.73 \times 10^{-2}$ moles per liter of pretreatment composition; and
(c) an electropositive metal;
wherein the molar ratio of (a) to (b) is at least 3:1; and
wherein the pretreatment composition is capable of reacting with and chemically altering the substrate surface and binding to it to form a film that affords corrosion protection.

13. The method of claim 12, wherein the pretreatment composition further comprises a fluoride source, an oxidizing agent, or combinations thereof.

14. The method of claim 13, further comprising contacting the surface with a pre-rinse composition prior to contacting at least a portion of the surface of the substrate with the pretreatment composition.

15. The method of claim 12, further comprising contacting the surface that has been contacted with the pretreatment composition with a sealer composition.

16. The method of claim 15, wherein the sealer composition comprises a Group IIIB metal, a Group IVB metal, a lanthanide, silica, aluminum, silane, organosilanes, phosphatized epoxies, or combinations thereof.

17. The method of claim 12, further comprising depositing a coating composition comprising a film-forming resin onto at least a portion of the surface that has been contacted with the pretreatment composition.

18. The method of claim 15, further comprising depositing a coating composition comprising a film-forming resin onto at least a portion of the surface that has been contacted with the sealer composition.

19. A treated metal substrate comprising:
a pretreatment layer formed on at least a portion of a surface of the substrate by contacting the portion of the surface of the substrate with a pretreatment composition comprising:
(a) a Group IIIB metal and/or a Group IVB metal in a total amount of 20 ppm to 1000 ppm (calculated as elemental metal) based on the total weight of the pretreatment composition;
(b) a compound containing at least six phosphorus-containing acid groups or salts thereof in an amount of $1.82 \times 10^{-4}$ moles per liter to $2.73 \times 10^{-2}$ moles per liter of pretreatment composition; and
(c) an electropositive metal;
wherein the molar ratio of (a) to (b) is at least 3:1; and
wherein the pretreatment composition is capable of reacting with and chemically altering the substrate surface and binding to it to form a film that affords corrosion protection.

20. The treated metal substrate of claim 19, wherein the pretreatment composition further comprises a fluoride source, an oxidizing agent, or combinations thereof.

21. The treated metal substrate of claim 19, further comprising a sealer layer comprising a Group IIIB metal, a Group IVB metal, a lanthanide, silica, aluminum, silane, organosilanes, phosphatized epoxies, or combinations thereof, wherein the sealer layer is formed on at least a portion of the pretreatment layer.

22. The treated substrate of claim 19, further comprising a coating derived from a coating composition comprising a film-forming resin deposited over at least a portion of the layer formed by the pretreatment composition.

23. The treated substrate of claim 21, further comprising a coating derived from a coating composition comprising a film-forming resin deposited over at least a portion of the layer formed by the sealer composition.

24. The pretreatment composition of claim 1, wherein the pretreatment composition is substantially free of titanium metal.

25. The pretreatment composition of claim 8, wherein the pretreatment composition is substantially free of titanium metal.

26. The method of claim 12, wherein the pretreatment composition is substantially free of titanium metal.

27. The treated metal substrate of claim 19, wherein the pretreatment composition is substantially free of titanium metal.

* * * * *